US012798303B2

(12) United States Patent
Arslan et al.

(10) Patent No.: US 12,798,303 B2
(45) Date of Patent: Nov. 17, 2026

(54) TIRE FILL ASSISTANCE SESSION CONTROL

(71) Applicant: SENSATA TECHNOLOGIES, INC., Attleboro, MA (US)

(72) Inventors: A. Tugay Arslan, Antrim (GB); Jonathan E. Barr, Tobermore (GB); Samuel D. Houston, Antrim (GB)

(73) Assignee: SENSATA TECHNOLOGIES, INC., Attleboro, MA (US)

(*) Notice: Subject to any disclaimer, the term of this patent is extended or adjusted under 35 U.S.C. 154(b) by 297 days.

(21) Appl. No.: 18/699,274

(22) PCT Filed: Oct. 7, 2022

(86) PCT No.: PCT/US2022/046001

§ 371 (c)(1),
(2) Date: Apr. 6, 2024

(87) PCT Pub. No.: WO2023/059860

PCT Pub. Date: Apr. 13, 2023

(65) Prior Publication Data

US 2024/0424840 A1 Dec. 26, 2024

Related U.S. Application Data

(60) Provisional application No. 63/253,830, filed on Oct. 8, 2021.

(51) Int. Cl.
*B60C 23/04* (2006.01)

(52) U.S. Cl.
CPC ...... *B60C 23/0479* (2013.01); *B60C 23/0408* (2013.01); *B60C 23/0442* (2013.01); *B60C 23/0461* (2013.01); *B60C 23/0484* (2013.01)

(58) Field of Classification Search
CPC ............ B60C 23/0479; B60C 23/0408; B60C 23/0442; B60C 23/0461; B60C 23/0484
See application file for complete search history.

(56) References Cited

U.S. PATENT DOCUMENTS 7,040,154 B2 * 5/2006 Shaw .................. B60C 23/0488 73/756
9,522,579 B1 * 12/2016 McIntyre ............ B60C 23/0408
(Continued)

OTHER PUBLICATIONS

International Search Report and Written Opinion, PCT/US2022/046001, Jan. 27, 2023, 10 pages.

*Primary Examiner* — John A Tweel, Jr.
(74) *Attorney, Agent, or Firm* — Mark H. Williams

(57) ABSTRACT

Methods, apparatuses, computer program products, systems for tire fill assistance session control are disclosed. In a particular embodiment, a method includes identifying, by a tire fill assistance controller, a user selection indicating a tire for electronic tire fill assistance; establishing, by the tire fill assistance controller in dependence upon the user selection, a wireless connection to a tire pressure monitoring (TPM) sensor associated with the tire; configuring, by the tire fill assistance controller, a tire pressure sampling rate of the TPM sensor for a tire fill assistance session; receiving, by the tire fill assistance controller, a plurality of tire pressure readings from the TPM sensor during the tire fill assistance session; and providing, by the tire fill assistance controller to a user, tire fill guidance based on the plurality of tire pressure readings.

20 Claims, 22 Drawing Sheets

(56) References Cited

U.S. PATENT DOCUMENTS

| | | | |
|---|---|---|---|
| 10,449,811 | B2 * | 10/2019 | Steiner .................... B60C 23/04 |
| 2006/0158324 | A1 | 7/2006 | Kramer |
| 2014/0188348 | A1 | 7/2014 | Gautama et al. |
| 2020/0221513 | A1 | 7/2020 | Kandler et al. |

* cited by examiner

TIRE FILL ASSISTANCE SESSION CONTROL

BACKGROUND

In some cases, tire fill stations may lack a tire pressure gauge or the tire pressure gauge may be unreliable. In recent years, there have been developments regarding tire fill assist in passenger vehicles. However, many of these improvements are not user friendly. For example, some tire fill assist systems use a vehicle horn or alarm to signal that the appropriate tire pressure has been reached. In certain environments or during certain times of day, the use of such systems may be disruptive. Further, these systems rely on communication only between the tire pressure sensors and the vehicle control system, and the user is unable to verify that the correct pressure has been reached. Still further, delays in transmitting or receiving tire pressure measurements between the tire pressure sensor and the vehicle control system may lead to overfill.

SUMMARY

Embodiments in accordance with the present disclosure are directed to tire fill assistance session control. In some embodiments, a tire pressure monitoring (TPM) sensor and a user device (e.g., a smart device or handheld tool) are configured to establish an electronic tire fill assist (ETFA) session through a direct wireless connection. The user can select a tire for ETFA and establish a connection to the corresponding TPM sensor prior to inflating the tire. Accordingly, the TPM sensor can be configured to increase the tire pressure sampling rate before inflation begins, thus providing more accurate tire pressure data that can help the user avoid overfill. Variations of these embodiments can improve battery consumption in the TPM sensor, provide safety enhancements, and improve the user experience. For example, variations can include features such as the adjustment of the transmission rate of connectable advertisements based on vehicle motion state, the adjustment of the connection interval/pressure sample rate based on the user activity in a user device application, and the adjustment of the connection interval/pressure sample rate based on time elapsed in a tire fill assist mode and a rate of change of pressure measured by the TPM sensor. Variations can include other features such as discontinuing the connection to the user device if the TPM sensors detect that the vehicle has started to move, or that the user has confirmed the filling event is complete, or that the ETFA session is ended based on inactivity. Variations can also include monitoring of TPM sensors to detect whether the user is inflating a tire they have not selected in the ETFA application, providing a fast reconnection mechanism if the user ceases and then restarts the ETFA application or after a connection drop, and utilization of user device data or cloud-based data relating to atmospheric pressure and ambient temperature for more accurate tire pressure measurements.

A particular embodiment is directed to a method and apparatus for tire fill assistance session control. In this embodiment, a tire fill assistance controller identifies a user selection indicating a tire for electronic tire fill assistance and establishing in dependence upon the user selection, a wireless connection to a tire pressure monitoring (TPM) sensor associated with the tire. The tire fill assistance controller configures a tire pressure sampling rate of the TPM sensor for a tire fill assistance session. In this embodiment, the tire fill assistance controller receives a plurality of tire pressure readings from the TPM sensor during the tire fill assistance session and provides to a user, tire fill guidance based on the plurality of tire pressure readings.

In another embodiment, tire fill assistance session control includes a tire pressure monitoring (TPM) sensor associated with a tire, transmitting one or more advertisement messages. In this embodiment, the TPM sensor establishes a wireless connection with a tire fill assistance controller and increases a tire pressure sampling rate. The TPM sensor provides to the tire fill assistance controller through the wireless connection, one or more tire pressure readings in accordance with the tire pressure sampling rate.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1A:
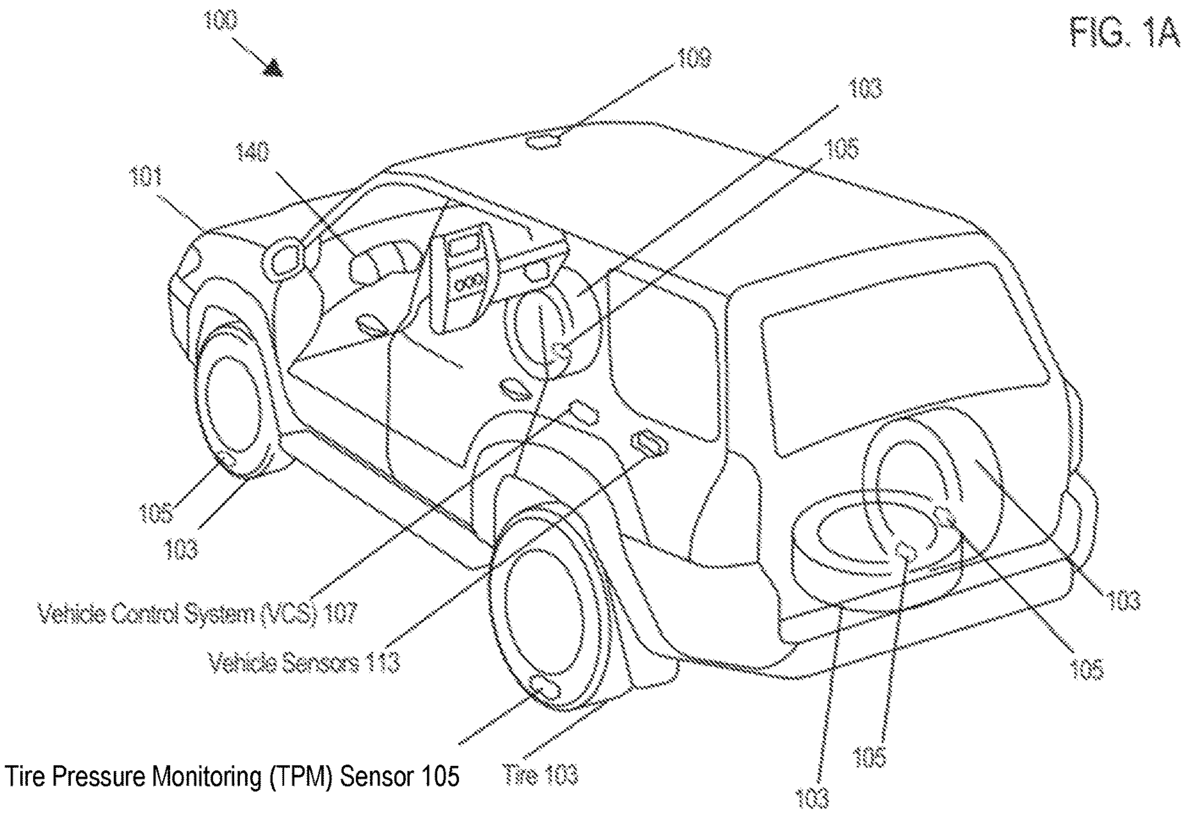
FIG. 1A sets forth an isometric diagram of a system for tire fill assistance session control in accordance with the present disclosure.
Figure 1B:
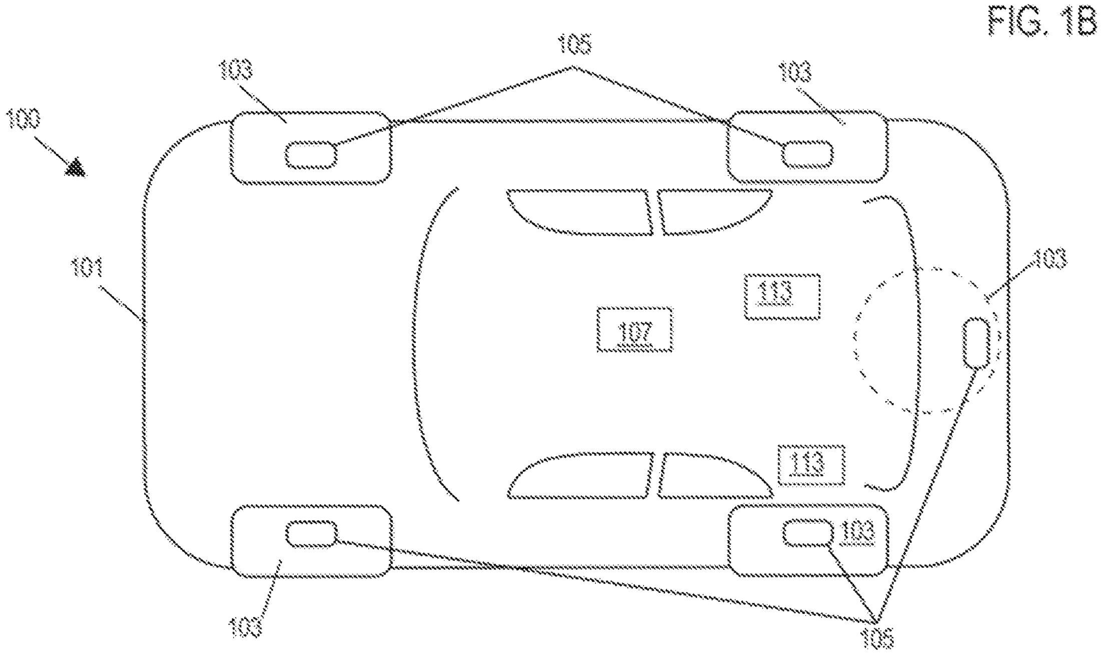
FIG. 1B sets forth a top view of the system of FIG. 1A.

Exemplary methods, apparatuses, and computer program products for tire fill assistance session control in accordance with the present disclosure are described with reference to the accompanying drawings, beginning with FIG. 1A. FIG. 1A sets forth an isometric diagram of a system 100 for tire fill assistance session control in accordance with the present disclosure. FIG. 1B sets forth a top view of the system of FIG. 1A. The system of FIG. 1A includes a vehicle 101 equipped with tires 103 that include tire pressure monitoring (TPM) sensor 105. A TPM sensor is a sensor that is configured to monitor and transmit the tire pressure of a tire. In the present disclosure, a TPM sensor may be coupled to some portion of the tire (e.g., mounted to an inner portion of the tire or on a valve stem). The TPM sensor may also be coupled to a wheel rim. As will be explained in greater detail below, a TPM sensor 105 may transmit tire pressure measurements to a receiver of a vehicle control system or a tire fill assistance controller of a user device.

The vehicle of FIG. 1A further includes a vehicle control system (VCS) 107 that controls various components and systems within a vehicle. In a particular embodiment, the VCS 107 includes a plurality of electronic control units (ECUs) that are configured to control one or more vehicle subsystems. Commonly referred to as the vehicle's "computers", an ECU may be a central control unit or may refer collectively to one or more vehicle subsystem control units, such as an Engine Control Module (ECM), a Powertrain Control Module (PCM), a Transmission Control Module (TCM), a Brake Control Module (BCM), a Central Timing Module (CTM), a General Electronic Module (GEM), or a Suspension Control Module (SCM). In an embodiment according to the present disclosure, the VCS 107 includes a BCM that includes an Antilock Braking System (ABS) and an Electronic Stability Program (ESP). Alternatively, the VCS 107 may comprise a Telematics Control Unit (TCU) independent of vehicle-based sensors (e.g., an aftermarket system). In the example of FIG. 1A, the vehicle 101 includes a dashboard display screen 140 for displaying messages from the VCS 107. For example, the VCS 107 may send a 'low tire pressure' message to a component connected to the dashboard display screen 140. In this example, in response to receiving the 'low tire pressure' message, the component may turn on a 'low tire pressure' indicator that is displayed on the dashboard display screen 140.

Each TPM sensor 105 may be equipped with a wireless transceiver for bidirectional wireless communication with the VCS 107. The VCS is similarly equipped with a wireless transceiver for bidirectional wireless communication with each of the TPM sensors 105. The bidirectional wireless communication may be realized by low power communication technology such as Bluetooth Low Energy (BLE) protocol or other low power bidirectional communication technology that is intended to conserve the amount of energy consumed by the TPM sensor. In at least one embodiment, each TPM sensor 105 communicates directly with a smart device (not shown), such as a smart phone, tablet, or diagnostic tool, as will be described in more detail below.

The vehicle system may include sensors 113 used to measure and communicate vehicle operating conditions. For example, the ABS may include wheel speed sensors on the wheelbase used to measure wheel speed. The ESP subsystem may include yaw rate sensors configured to measure the yaw-induced acceleration of the vehicle when the vehicle is maneuvering a curve. Readings from such sensors 113 may be provided to the VCS 107, which may provide parameters based on these readings to the TPM sensor 105.

The vehicle 101 may further include a transceiver 109 communicatively coupled to the VCS 107 for cellular terrestrial communication, satellite communication, or both.

The arrangement of devices making up the exemplary system illustrated in FIGS. 1A and 1B are for explanation, not for limitation. Data processing systems useful according to various embodiments of the present disclosure may include additional servers, routers, other devices, and peer-to-peer architectures, not shown in FIGS. 1A and 1B, as will occur to those of skill in the art. Networks in such data processing systems may support many data communications protocols, including for example TCP (Transmission Control Protocol), IP (Internet Protocol), Bluetooth protocol, Near Field Communication, Controller Area Network (CAN) protocol, Local Interconnect Network (LIN) protocol, FlexRay protocol, and others as will occur to those of skill in the art. Various embodiments of the present disclosure may be implemented on a variety of hardware platforms in addition to those illustrated in FIGS. 1A and 1B.

Figure 2:
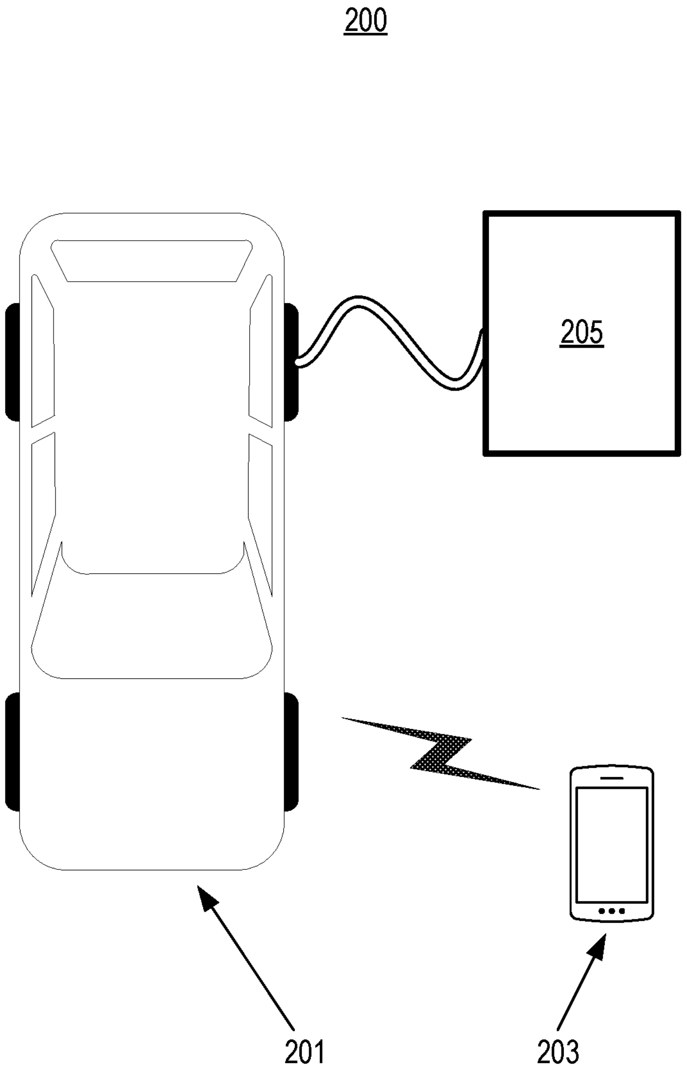
FIG. 2 illustrates a reference diagram of an example tire fill environment with the present disclosure.

For further explanation, FIG. 2 sets forth a block diagram of a system for tire fill assistance using bidirectional tire pressure monitoring sensors according to embodiments of the present disclosure. The example depicted in FIG. 2 includes a tire inflation process environment 200 that includes a vehicle 201, a user device 203, and a tire inflation unit 205. In the example depicted in FIG. 2, the vehicle 201 may be similarly configured as the vehicle 101 of FIG. 1A and FIG. 1B. For example, the vehicle 201 of FIG. 2 includes various tire pressure monitoring sensors 105, vehicles sensors 113, tires 103, and a VCS 107 as previously described. In the example depicted in FIG. 2, the user device 203 is configured to receive tire pressure information including tire pressure measurements and placard pressure information from a tire pressure monitoring sensor 105. In some examples, the user device 203 may be a smart phone, tablet, smart watch, or similar device. The user device 203 includes an application for automated tire fill using bidirectional tire pressure monitoring sensors that includes processor-executable instructions for receiving tire pressure information from the vehicle 201 and displaying the tire pressure information. In some examples, a communication session is established between the application on the user device 203 and the tire inflation unit 205, e.g., via BLE. When a user is inflating a tire using the tire inflation unit, the user may initiate an electronic tire fill assistance (ETFA) session to monitor the tire pressure of a tire as it is inflated by the inflation unit 205.

Figure 3:
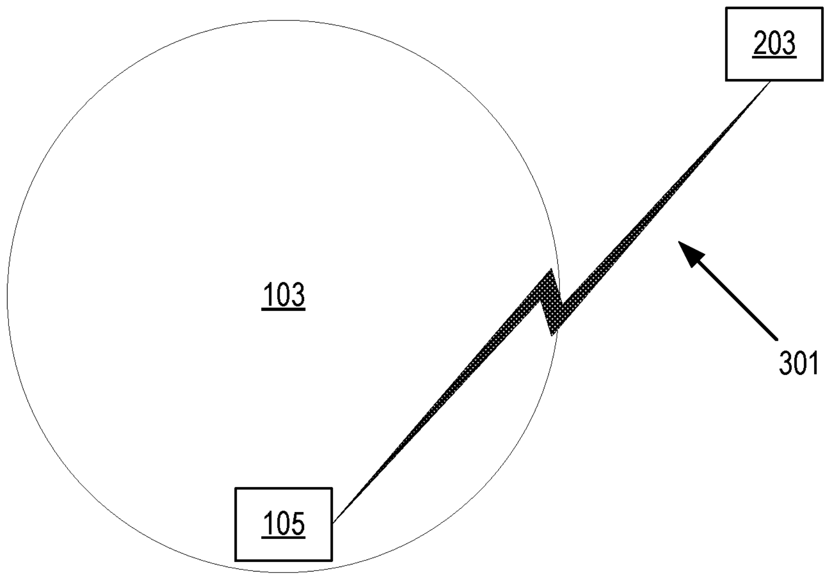
FIG. 3 illustrates a block diagram of an exemplary tire fill assistance system in accordance with the present disclosure.

FIG. 3 illustrates a block diagram of an exemplary TPM sensor 105 in accordance with the present disclosure. A TPM sensor 105 in or adjacent to the tires 103 of the vehicle 201 may include tire pressure monitoring system (TPMS) sensors, tire mounted sensors that measure tire pressure, or other tire monitoring sensors. The TPM sensor 105 includes a transceiver configured for two-way communication with the VCS 107 or a user device 203. For example, the two-way communication may be achieved via respective Bluetooth Low Energy (BLE) transceivers. The TPM sensor 105 communicates tire pressure information such as tire pressure measurements or placard pressure information. In some examples, the TPM sensor 105 includes a storage device for recording placard pressure information for its tire 103 and a user device 203 obtains placard pressure information directly from the TPM sensor 105. In other examples, the user device 203 obtains the placard pressure information from an external database based on vehicle identification data or tire identification data provided by the TPM sensor 105. The TPM sensor 105 communicates tire pressure readings based on tire pressure measurements by the tire pressure monitoring sensor.

In a particular embodiment, the TPM sensor 105 and the user device 203 communicate via wireless connection 301 established in accordance with the BLE protocol. In employing the BLE protocol or a similar bidirectional communications protocol, the TPM sensor 105 broadcasts advertisements to allow discovery of the TPM sensor by other devices. The advertisements can be connectable advertisements that invite a connection to the TPM sensor, or non-connectable advertisements that simply provide data or act as beacons. In some examples, the advertisement includes data such as a TPM sensor identifier, flags, reason codes, payload data, and so on. The user device 203 monitors advertisements from BLE devices that are broadcast over specified advertisement channels and utilizes the connectable advertisement from the TPM sensor 105 to establish a wireless connection with the TPM sensor 105. Once the connection is established, the user device 203 and TPM sensor 105 exchange connection event messages at a particular connection interval. These connection event messages keep the connection alive and are also used to communicate data. For example, tire pressure data may be communicated in a connection event message. Particular parameters of the connection 301, such as the connection interval, may be negotiated by the user device 203 and the TPM sensor 105. In addition to receiving tire pressure data from the TPM sensor 105, the user device 203 can also transmit commands to the TPM sensor, such as a command to increase or decrease a sampling rate, or a command to reconfigure connection parameters.

Figure 4:
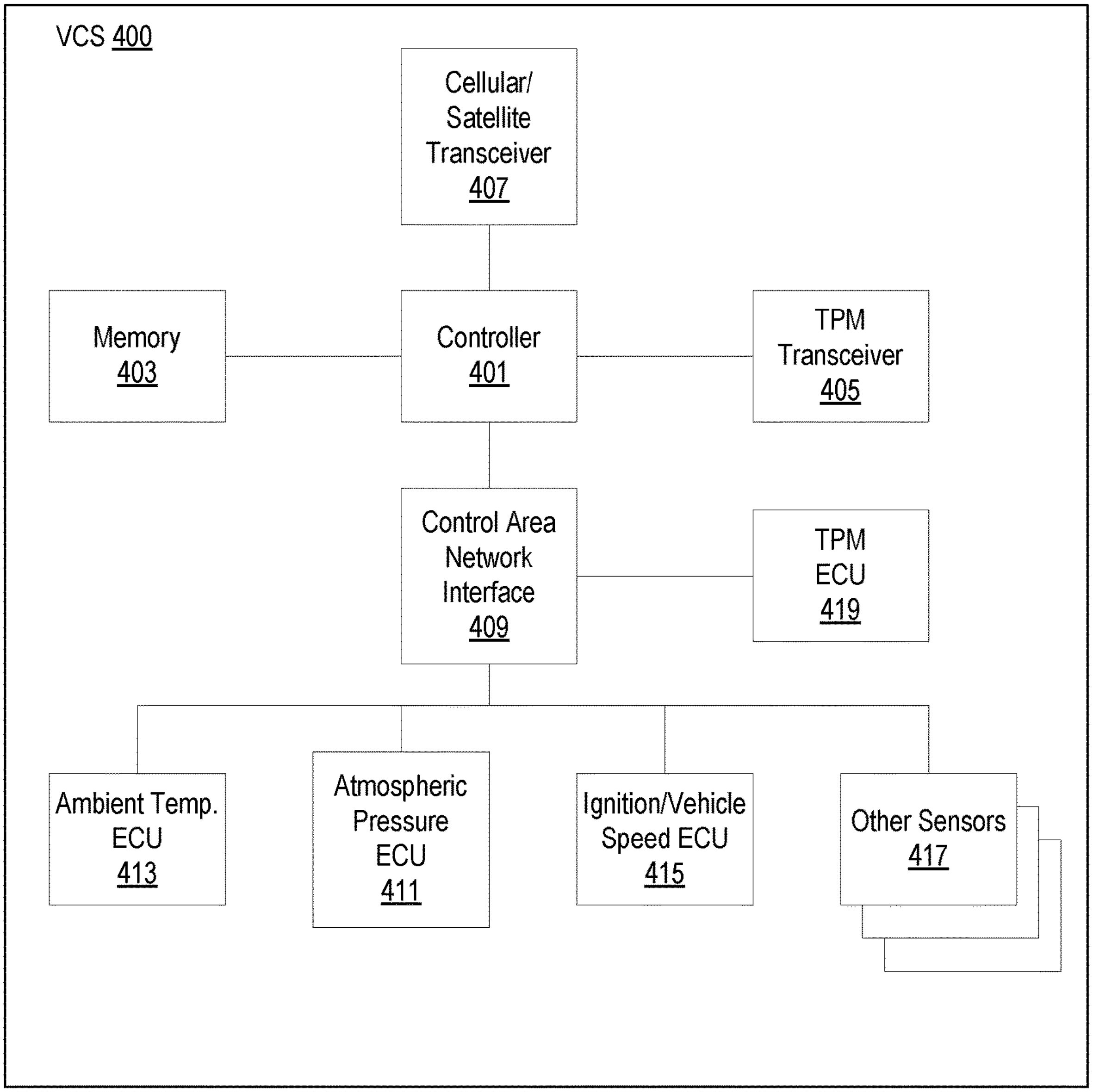
FIG. 4 illustrates a block diagram of an exemplary vehicle control system (VCS) in accordance with the present disclosure.

For further explanation, FIG. 4 sets forth a diagram of an exemplary vehicle control system (VCS) 400 for tire fill assistance session control according to embodiments of the present disclosure. The VCS 400 includes a controller 401 coupled to a memory 403. The controller 401 is configured to obtain sensor readings related to vehicle operating conditions, as well as data from sources external to the vehicle, including tire pressure data from a TPM sensor. The controller may include or implement a microcontroller, an Application Specific Integrated Circuit (ASIC), a general-purpose processor, a digital signal processor (DSP), a programmable logic array (PLA) such as a field programmable gate array (FPGA), or other data computation unit in accordance with the present disclosure. The sensor readings and data from the TPM sensor, may be stored in the memory 403. The memory 403 may be a non-volatile memory such as flash memory. For example, the VCS 400 may obtain vehicle operating condition data, such as sensor readings from sensors on-board the vehicle. The VCS 400 may further include a transceiver 407 for cellular terrestrial communication, satellite communication, or both. For bidirectional wireless communication with a TPM sensor, the VCS 400 includes a TPM transceiver 405 coupled to the controller 401. In one embodiment, the TPM transceiver 405 is configured for Bluetooth Low Energy protocol communication.

The VCS 400 may further comprise a controller area network (CAN) interface 409 for communicatively coupling electronic control units (ECUs), vehicle sensors, and devices to each other and to the controller 401. Examples of such devices can include an atmospheric pressure unit such as atmospheric pressure ECU 411. The atmospheric pressure ECU 411 generates an atmospheric pressure parameter based on, for example, readings of atmospheric pressure from a pressure sensing device. Another example of a coupled device is an ambient temperature unit such as ambient temperature ECU 413. The ambient temperature ECU 413 generates an ambient temperature parameter based on, for example, readings of an ambient temperature sensing device. Another example of a coupled device is an ignition/wheel speed ECU 415. The ignition/wheel speed ECU 415 generates a wheel speed parameter based on, for example, readings from a wheel speed sensor. The ignition/wheel speed ECU 415 also generates an ignition parameter based on whether the engine is determined to be on or off. Another example of a coupled device includes a TPM ECU 419.

In some examples, the TPM ECU 419 communicates with the TPM sensor associated with each tire to obtain tire pressure data and communicates information related to the tire pressure data to the controller 401 as necessary. For example, the TPM ECU communicates with the TPM sensors over wireless connections, such as BLE wireless connections. In some examples, the TPM ECU 419 transmits ambient conditions parameters to the TPM sensors. For example, the ambient conditions parameters can include the ambient temperature from the temperature ECU 413 or ambient atmospheric pressure from the atmospheric pressure ECU 411. In a particular example, the controller 401 is configured to detect that the vehicle is stopped based on wheel speed data or ignition data from the ignition/wheel speed ECU 415, and control the TPM ECU 419 to transmit the ambient temperature parameter from the ambient temperature ECU 413 and the atmospheric pressure parameters from the atmospheric pressure ECU 411 to the TPM sensors, so that those parameters may be accessible to the TPM sensors for performing tire pressure calculations when the vehicle is off. In other examples, the VCS 400 obtains ambient conditions parameters through access to a remote server over a cellular communications connection. The ambient conditions parameters may be based on a location derived from a GPS sensor. The CAN interface 409 also communicatively couples other vehicles sensors 417 that will be recognized by those of skill in the art to the controller 401.

Figure 5:
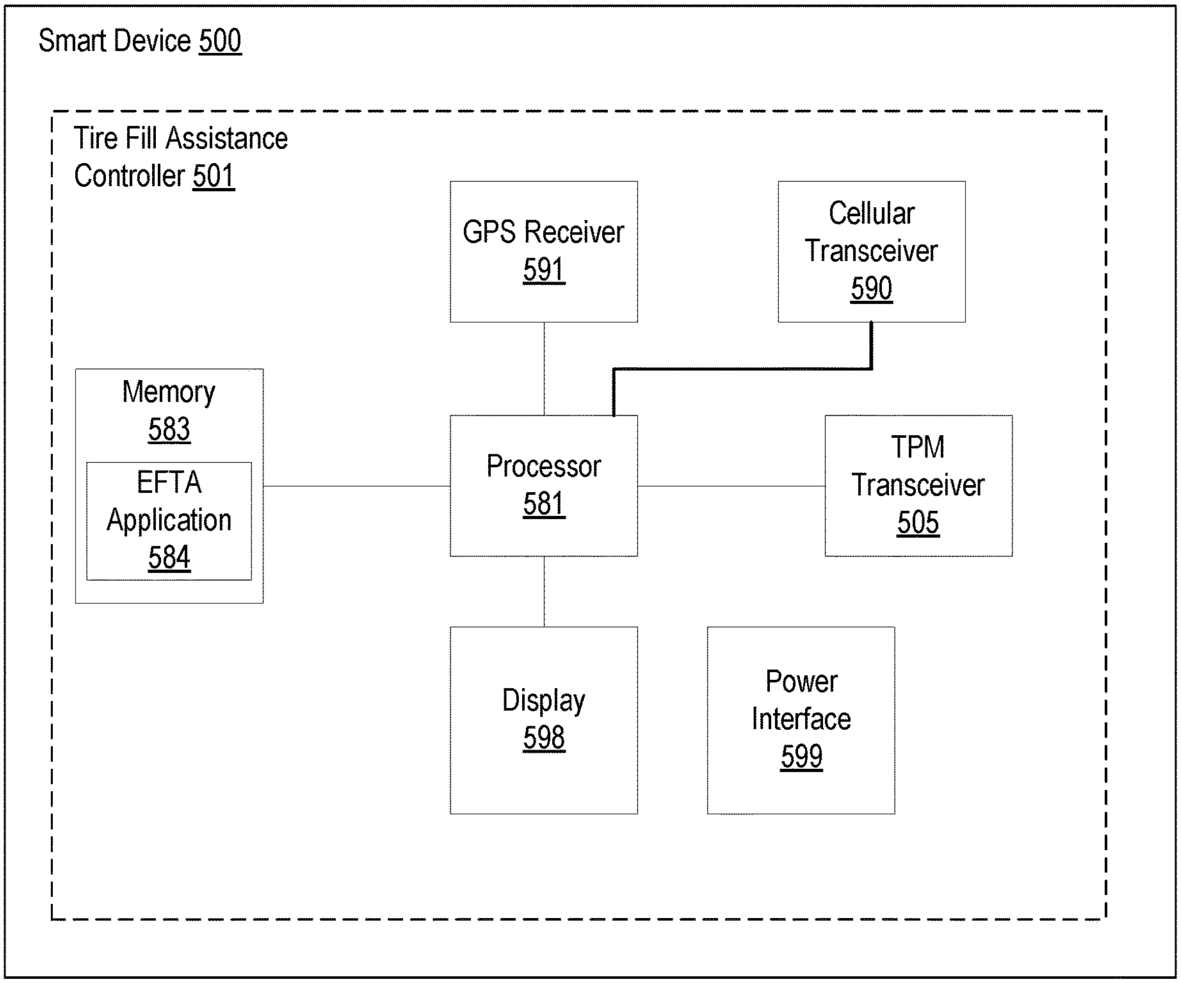
FIG. 5 illustrates block diagram of an exemplary smart device in accordance with the present disclosure.

For further explanation, FIG. 5 sets forth a diagram of a smart device 500 for tire fill assistance session control in accordance with at least one embodiment of the present disclosure. The smart device 500 may be, for example, a smart phone, a tablet, a smart watch, or the like. The smart device 500 of FIG. 5 includes a processor 581, such as a general-purpose processor, and memory 583. The smart device 500 further includes a cellular transceiver 590 for communicating with a cellular communications provider to provide Internet access to the smart device 500. The smart device 500 also includes a Global Positioning System (GPS) receiver 591 configured to utilize one or more GPS satellites in order to determine a vehicle location, speed, direction of movement, etc. The smart device 500 also includes a display 598 that displays, for example, a user interface for an application that executes on the processor 581. The smart device 500 may receive power from a power interface 599 couplable to a battery or to a vehicle power source.

Figure 6:
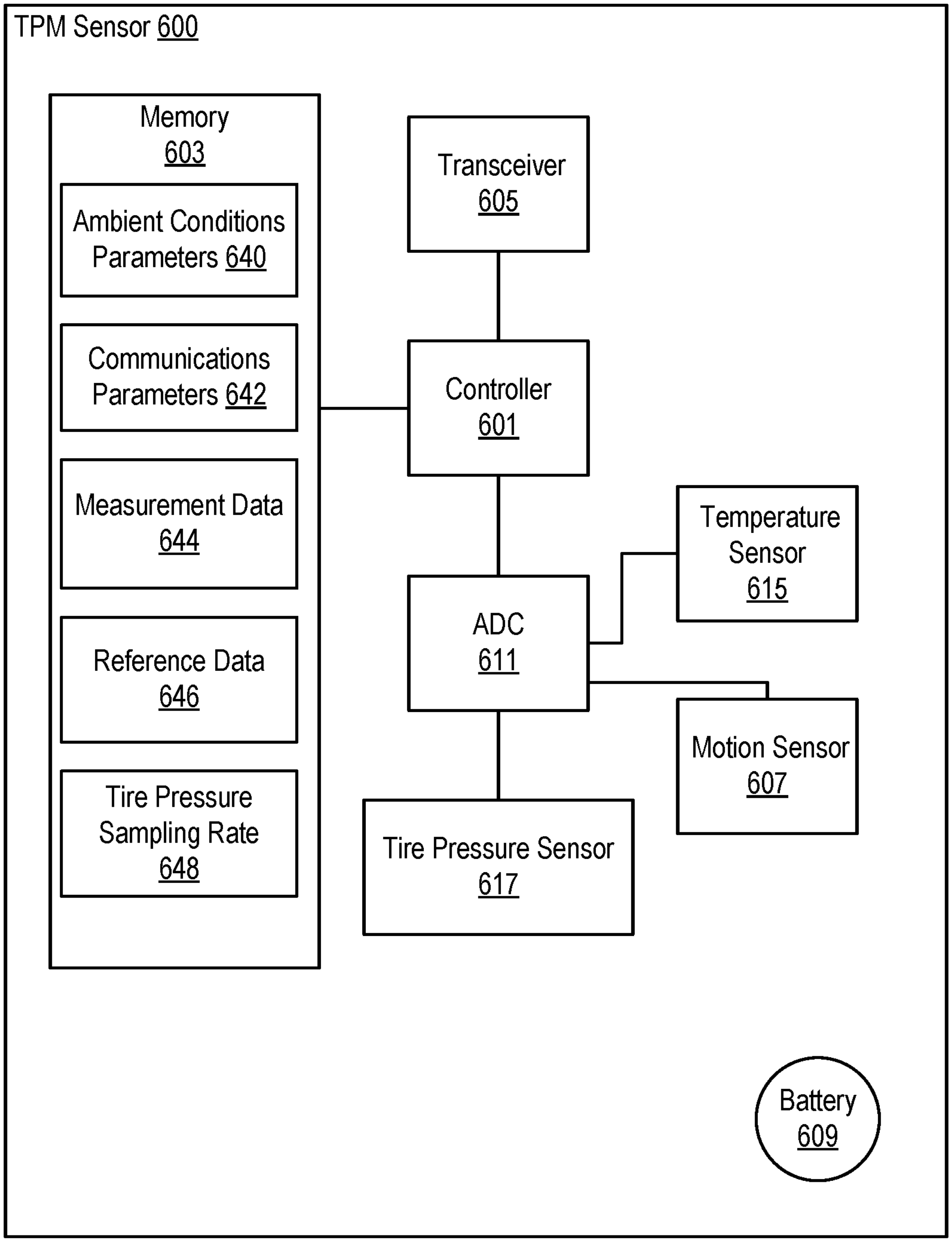
FIG. 6 illustrates a block diagram of an exemplary TPM sensor in accordance with the present disclosure.

For bidirectional wireless communication with the TPM sensor 600 of FIG. 6, the smart device 500 includes a TPM transceiver 505 coupled to the processor 581. In at least one embodiment, the TPM transceiver 505 is configured to operate as a BLE transmitter-receiver, where the tire fill assistance controller 501 controls the TPM transceiver 505 to implement a BLE communications protocol and establish BLE wireless connections. In other embodiments, the TPM transceiver 505 may implement other types of bidirectional communication technology. Through the TPM transceiver 505, the tire fill assistance controller 501 wirelessly receives TPM advertisements, wirelessly establishes a connection with the TPM sensor, wirelessly transmits parameters and data to the TPM sensor, and wirelessly receives tire pressure data from the TPM sensor.

In a particular embodiment, the memory 583 stores an electronic tire fill assistance (ETFA) application 584. The ETFA application 584 is embodied in a set of computer-readable instructions that, when executed by the processor 581 cause the smart device 500 to carry out the operations of a tire fill assistance controller 501 that provides tire fill assistance to a smart device user based on tire pressure data received from a TPM sensor. In at least one embodiment, the tire fill assistance controller 501 is configured to identify a user selection indicating a tire for electronic tire fill assistance; establish, in dependence upon the user selection, a wireless connection to a tire pressure monitoring (TPM) sensor associated with the tire; configure a tire pressure sampling rate of the TPM sensor for a tire fill assistance session; receive a plurality of tire pressure readings from the TPM sensor during the tire fill assistance session; and provide, to a user, tire fill guidance based on the plurality of tire pressure readings. The tire pressure sampling rate may be configured by the tire fill assistance controller prior to tire inflation.

In some variations, the tire fill assistance controller 501 is configured to identify that tire inflation is detected by the TPM sensor; and notify the user that tire inflation is detected in the tire. In some variations, the tire fill assistance controller 501 is configured to detect an inactivity state; and reconfigure, in response to the inactivity state, at least one of a connection parameter for the wireless connection and a tire pressure sampling rate of the TPM sensor. In some variations, the tire fill assistance controller 501 is configured to terminate the tire fill assistance session in response to determining that the inactivity state has exceeded a maximum inactivity duration. In some variations, the tire fill assistance controller 501 is configured to terminate the tire fill assistance session in response to determining that one or more tires of the vehicle are in motion.

In some variations, the tire fill assistance controller 501 is configured to initiate a rapid reconnection procedure for reconnecting to the TPM sensor in response to detecting a termination of the wireless connection. In some variations, the tire fill assistance controller 501 is configured to identify, while the tire fill assistance session is active for the tire, that tire inflation is detected in a different tire; and indicate to a user that tire inflation is detected in the different tire. In some variations, the tire fill assistance controller 501 is configured to provide to the TPM sensor, one or more ambient conditions parameters. The one or more ambient conditions parameters may include at least one of an atmospheric pressure parameter, an ambient temperature parameter, and an altitude parameter.

Additional details regarding the above operations, which the tire fill assistance controller 501 is configured to carry out, are described in greater detail below. Further, one or more of the above-described components of the smart device 500 may be integrated in a system-on-chip (SoC) computing device.

For further explanation, FIG. 6 sets forth a diagram of an exemplary tire pressure monitoring (TPM) sensor 600 for tire fill assistance session control according to embodiments of the present disclosure. The TPM sensor 600 includes a controller 601. The controller 601 may include or implement a processor, an Application Specific Integrated Circuit (ASIC), a digital signal processor (DSP), a programmable logic array (PLA) such as a field programmable gate array (FPGA), or other data computation unit in accordance with the present disclosure. In an embodiment, the controller 601 of the TPM sensor 600 is configured to cause the TPM sensor 600 to transmit one or more advertisement messages; establish a wireless communications connection with a tire fill assistance controller; increase a tire pressure sampling rate based on communication with the tire fill assistance controller; and provide, to the tire fill assistance controller through the wireless connection, one or more tire pressure readings in accordance with the tire pressure sampling rate.

In some variations, the controller 601 of the TPM sensor 600 is configured to cause the TPM sensor 600 to reduce, in response to detecting an inactivity state, a tire pressure sampling rate of the TPM sensor. In some variations, the controller 601 of the TPM sensor 600 is configured to cause the TPM sensor 600 to terminate a tire fill assistance session in response to determining that the inactivity state has exceeded a maximum inactivity duration. In some variations, the controller 601 of the TPM sensor 600 is configured to cause the TPM sensor 600 to terminate the tire fill assistance session in response to determining that one or more tires of the vehicle are in motion.

In some variations, transmitting, by a TPM sensor associated with a tire, one or more advertisement messages includes: initiating, by the TPM sensor, connectable advertisements in response to detecting motion of the tire; and discontinuing, by the TPM sensor, the connectable advertisements in response to detecting that motion of the tire has stopped and a service duration has expired. In some variations, transmitting, by a TPM sensor associated with a tire, one or more advertisement messages includes: initiating, by the TPM sensor, connectable advertisements in response to detecting inflation of the tire; and discontinuing, by the TPM sensor, the connectable advertisements in response to detecting that inflation of the tire has stopped.

In some variations, the controller 601 of the TPM sensor 600 is configured to cause the TPM sensor 600 to initiate rapid connectable advertisements in response to determining that a tire fill assistance session has been terminated. In some variations, the controller 601 of the TPM sensor 600 is configured to cause the TPM sensor 600 to receive one or more ambient conditions parameters. The one or more ambient conditions parameters may include at least one of an atmospheric pressure parameter, an ambient temperature parameter, and an altitude parameter.

Additional details regarding the above operations that the TPM sensor 600 is configured to carry out are described in greater detail below.

The TPM sensor of FIG. 6 also includes a memory 603 coupled to the controller 601. The memory 603 may store ambient conditions parameters 640 including, for example, an ambient temperature parameter, an ambient atmospheric pressure parameter, and an altitude parameter, which may be received from, for example, the VCS 400 or the smart device 500. The memory 603 may store communications parameters 642 such as a connection interval, a service mode duration, a standard connection advertisement transmission rate, a rapid connection advertisement transmission rate, and the like. The memory may also store measurement data 644 such as a measured tire pressure, a measured tire temperature, and so on. The memory 603 may also store reference data 646, such as a TPM sensor identifier, a tire identifier (e.g., manufacturer make and model), manufacturer specifications for tire dimension (e.g., placard pressure), which may be programmed into the TPM sensor 600 at installation, as well characteristic equations for compensating dynamic characteristics such as tire temperature and atmospheric pressure in determining a tire pressure. The memory 603 may also store a configurable tire pressure sampling rate 648.

For bidirectional wireless communication with the VCS 400 and the smart device 500, the TPM sensor 600 of FIG. 6 includes a transceiver 605 coupled to the controller 601. In at least one embodiment, the transceiver 605 is configured to operate as a BLE transmitter-receiver, where the controller 601 controls the transceiver 605 to implement a BLE communications protocol and establish BLE wireless connections. In other embodiments, the transceiver 605 may implement other types of low energy bidirectional communication technology that is intended to conserve energy consumed in the TPM sensor 600. Through the transceiver 605, the TPM sensor wirelessly broadcasts advertisements and wirelessly transmits tire pressure data to, for example, the VCS 400 or the tire fill assistance controller 501.

The TPM sensor 600 of FIG. 6 also includes a motion detection sensor 607. In various examples, the motion detection sensor 607 of FIG. 6 can be an acceleration sensor, an accelerometric device, a shock sensor, a force sensor, a microelectromechanical systems (MEMs) sensor, or other device that is similarly responsive to motion. The TPM sensor 600 of FIG. 6 also includes a tire pressure sensor 617 that generates electrical signals in response to a tire pressure in the tire. The TPM sensor 600 of FIG. 6 also includes a tire temperature sensor 615 that generates electrical signals in response to a temperature in the tire. The TPM sensor 600 of FIG. 6 also includes at least one analog to digital converter (ADC) 611 that receives the electric pulse signals from at least the tire pressure sensor 617, samples the signals according to a sampling rate, and converts the raw analog signals received into a digital reading that is read by the controller 601.

The TPM sensor 600 of FIG. 6 also includes a battery 609 connected to a power bus (not shown) to power the transceiver 605, the controller 601, the ADC 611, the motion sensor 607, the pressure sensor 617, the temperature sensor 615, and the memory 603. The TPM sensor 600 may be powered by other sources alternative to or in addition to the battery 609, such as an energy harvester or other power source.

Figure 7:
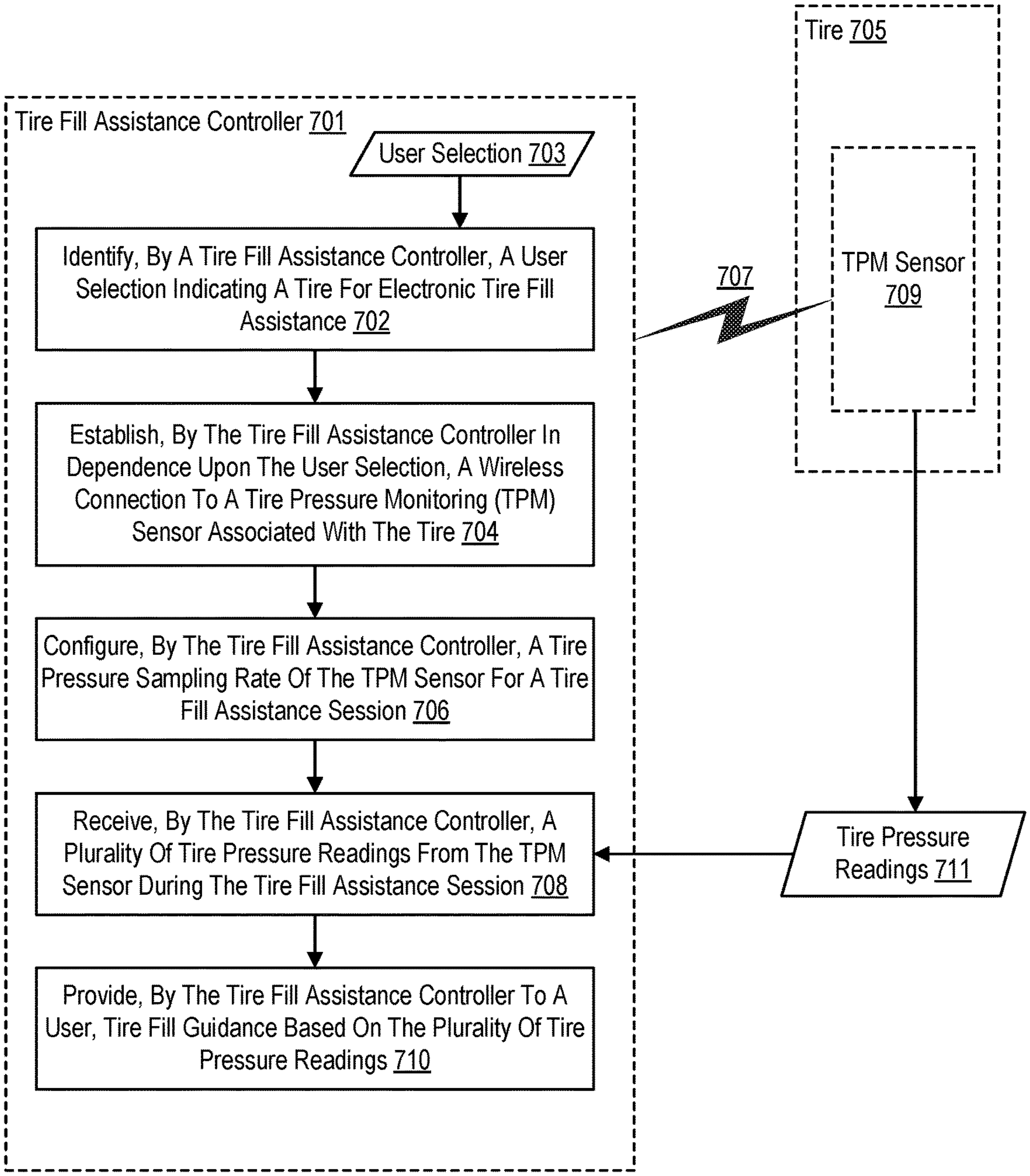
FIG. 7 sets forth a flowchart of an example method for tire fill assistance session control in accordance with the present disclosure.

For further explanation, FIG. 7 sets forth a flow chart illustrating an exemplary method for tire fill assistance session control according to at least one embodiment of the present disclosure that includes identifying 702, by tire fill assistance controller 701, a user selection 703 indicating a tire 705 for electronic tire fill assistance (ETFA). In various implementations, the tire fill assistance controller 701 can be implemented by an ETFA application embodied as a set of processor-executable programming instructions executing on a processor of a device, such as the smart device 500 of FIG. 5. In other implementations, the tire fill assistance controller 701 can be implemented by an application specific controller of the tire fill assistance tool. In other implementations, the tire fill assistance controller 701 can be implemented by an embedded controller of the vehicle. In some examples, identifying 702 the user selection indicating the tire 705 for ETFA includes receiving a user input indicating the tire 705 through an ETFA user interface provided by the tire fill assistance controller 701. For example, an ETFA application can provide a graphical user interface that allows the user to select a tire for ETFA. In one example, the graphical user interface displays an overhead representation of the vehicle. The user, through a touch screen of a smart device for example, selects the tire for ETFA by touching the appropriate tire in the graphical representation. In other examples, the user selects the tire for ETFA from a displayed list of tires identified by their position on the car (e.g., front driver, rear passenger, etc.).

The example method of FIG. 7 also includes establishing 704, by the tire fill assistance controller 701 in dependence upon the user selection, a wireless connection 707 to a tire pressure monitoring (TPM) sensor 709 associated with the tire 705. In some examples, the tire fill assistance controller 701 establishes 704 the wireless connection 707 with a TPM sensor 709 by first monitoring connectable advertisements transmitted by one or more TPM sensors corresponding to one or more vehicle tires. For example, the tire fill assistance controller 701 may monitor the connectable advertisements through a transceiver configured for the BLE protocol. Of the TPM sensors identified from their connectable advertisements during the monitoring, the tire fill assistance controller 701 selects the TPM sensor 709 associated with the tire 705 indicated by the user selection. In some examples, the connectable advertisements transmitted by each TPM sensor include an indication of the tire location on the vehicle. In these examples, the tire fill assistance controller 701 maps the tire location indicated in the user selection to the corresponding TPM sensor 709 based on its advertised tire location. Although, in other examples, a data structure maps TPM sensors identifiers to tire locations. In these examples, the tire fill assistance controller 701 obtains TPM sensor identifiers from the connection advertisements and maps the tire location indicated by the user selection, using the data structure, to the corresponding TPM sensor 709. Such a data structure may be generated based on a prior configuration, pairing, or initialization and stored in a memory accessible to the tire fill assistance controller 701. In some examples, the tire fill assistance controller 701 establishes 704 the wireless connection 707 by sending a connection message to the TPM sensor 709 associated with the tire 705. For example, the connection message may be a BLE protocol connection message.

The method of FIG. 7 also includes configuring 706, by the tire fill assistance controller 701, a tire pressure sampling rate of the TPM sensor 709 for a tire fill assistance session. Typically, a tire pressure sampling and/or reporting rate of the TPM sensor during standard operation that is too low to provide accurate tire pressure measurements that can prevent the user from overfilling the tire before an alert can be signaled. An example tire pressure sampling rate during standard operation may be on the order of one sample every 10 seconds. An example tire pressure sampling rate during ETFA may be on the order of one sample every 500 milliseconds. Thus, prior to the user initiating tire inflation, it is advantageous that the tire fill assistance controller 701 and TPM sensor 709 increase the tire pressure sampling rate.

In some examples, the tire fill assistance controller 701 directly configures 706 the tire pressure sampling rate by sending a message to the TPM sensor 709 that sets a tire sampling rate. For example, the message may be a BLE packet data unit (PDU) that includes a command to update the tire pressure sampling rate to a specified value. In other examples, the tire fill assistance controller 701 indirectly configures 706 the tire pressure sampling rate by configuring a connection interval for the wireless connection. As mentioned above, wireless connection protocols such as the BLE protocol may keep the connection alive using periodic connection event messages. These keep-alive messages are transmitted in accordance with a connection interval parameter that specifies how often the connection messages are transmitted. In some examples, the TPM sensor 709 is configured to match a tire pressure sampling rate to a connection interval or multiple of the connection interval for the wireless connection 707. For example, if the connection interval is 500 milliseconds, the TPM sensor 709 sets the tire pressure sampling rate to be once per 500 milliseconds. Thus, if the connection interval changes, the tire pressure sampling rate changes accordingly.

The example method of FIG. 7 also includes receiving 708, by the tire fill assistance controller 701, a plurality of tire pressure readings 711 from the TPM sensor 709 during the tire fill assistance session. In some examples, upon connection establishment, the tire fill assistance controller 701 enables tire pressure indications on the TPM sensor 709. In response, the TPM sensor 709 transmits messages to the tire fill assistance controller 701 that include tire pressure readings. In some examples, the TPM sensor 709 collects tire pressure readings in accordance with tire pressure sampling rate and transmits each as the payload of a packet such as a connection event message. Thus, the TPM sensor 709 transmits a connection event message including a tire pressure reading once per connection interval. In such examples, the tire fill assistance controller 701 receives 708 the plurality of pressure readings 711 from the TPM sensor 709 by receiving the connection event messages and identifying the tire pressure reading in the payload of the connection event message.

The example method of FIG. 7 also includes providing 710, by the tire fill assistance controller 701 to a user, tire fill guidance based on the plurality of tire pressure readings 711. In some examples, the tire fill assistance controller 701 provides 710 tire fill guidance by triggering an audible alert, alarm, or other notification on a smart device (e.g., the smart device that includes the tire fill assistance controller 701). For example, the alert, alarm, or other notification may sound when the tire pressure has reached the placard pressure. In further examples, the tire fill assistance controller 701 provides 710 tire fill guidance by causing tire fill indicia to be displayed on a user interface. For example, the user interface may visually indicate that the tire has reached the placard pressure and/or may display the current measured tire pressure and the placard pressure. The user interface may also utilize colors to indicate that tire inflation should continue or stop. In some examples, the tire fill assistance controller 701 receives placard pressure information from the TPM sensor 709 or from the vehicle control system.

Figure 8:
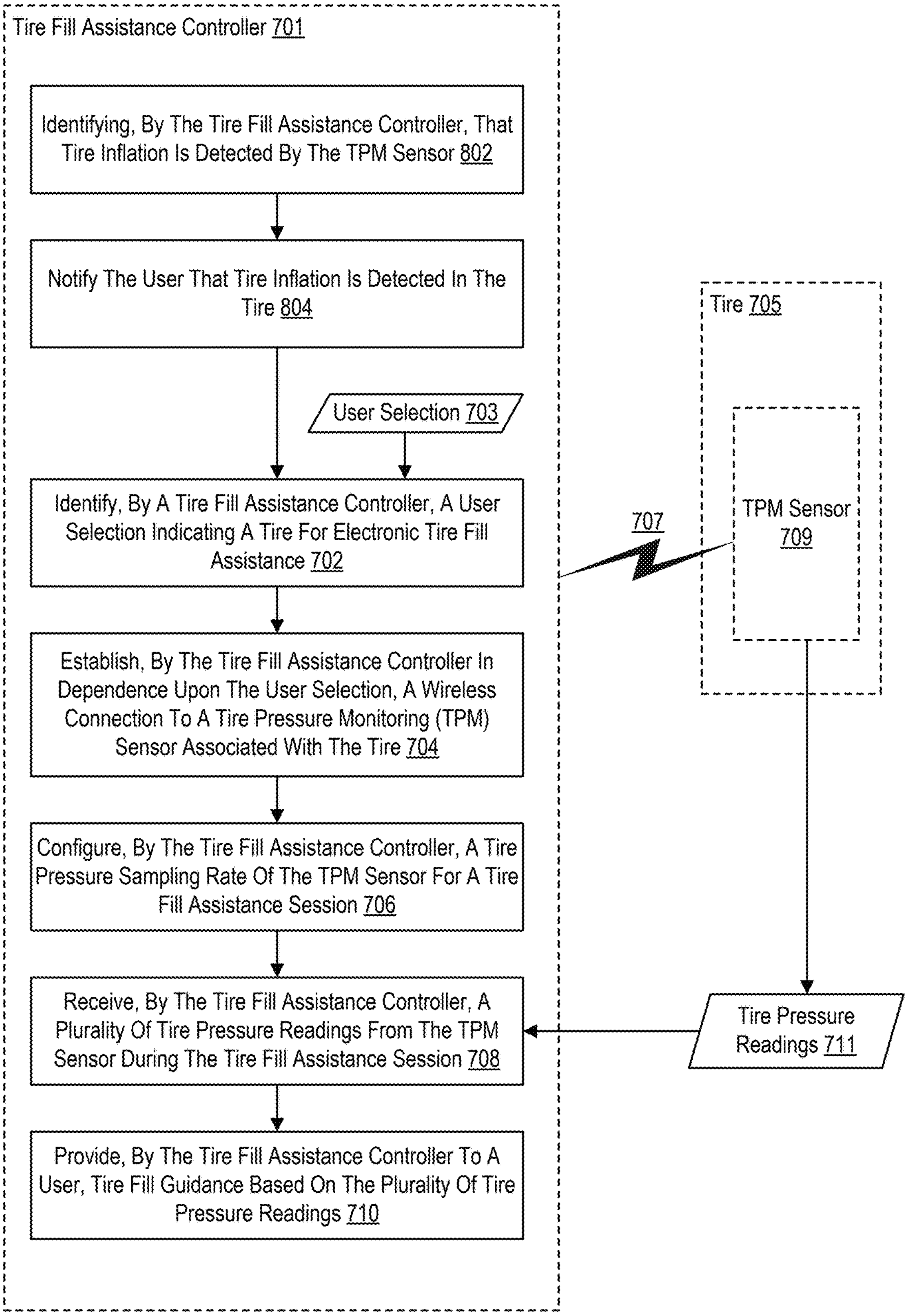
FIG. 8 sets forth a flowchart of another example method for tire fill assistance session control in accordance with the present disclosure.

For further explanation, FIG. 8 sets forth a flow chart illustrating another exemplary method for tire fill assistance session control according to at least one embodiment of the present disclosure. The example method of FIG. 8 is similar to the example method of FIG. 7 in that the example method of FIG. 8 also includes the steps of FIG. 7. In some cases, the user may forget to provide the user selection of the tire before commencing with inflation of that tire. Accordingly, the example method FIG. 8 further includes identifying 802, by the tire fill assistance controller 701, that tire inflation is detected by the TPM sensor 709. The tire fill assistance controller 701 may monitor connection advertisements from the various TPM sensors even though the user has not selected a tire for tire fill assistance. For example, an ETFA application may monitor connection advertisements as long as the ETFA application is active. Further, in some examples, when a TPM sensor detects tire inflation in the tire, that TPM sensor may modify its connection advertisements to include a flag, reason code or other data indicating that tire inflation has been detected. In such examples, the tire fill assistance controller 701 identifies that tire inflation has been detected by the TPM sensor 709 by identifying a connection advertisement that includes such an indication.

The example of FIG. 8 also includes notifying 804 the user that tire inflation is detected in the tire 705. In some examples, the tire fill assistance controller 701 notifies 804 the user that tire inflation is detected in the tire by causing a message to be displayed in a user interface. For example, the user may be notified by displaying a message on a display screen of a smart device that includes the tire fill assistance controller 701. The notification can indicate that tire inflation has been detected on the tire even though no tire fill assistance session has been initiated by the user. In some examples, the user interface indicates the tire for which tire inflation has been detected and prompts the user to initiate a tire fill assistance session for the tire. When the user selects the tire, the tire fill assistance controller 701 establishes a wireless connection for a tire fill assistance session with the TPM sensor associated with that tire, as discussed above.

Figure 9:
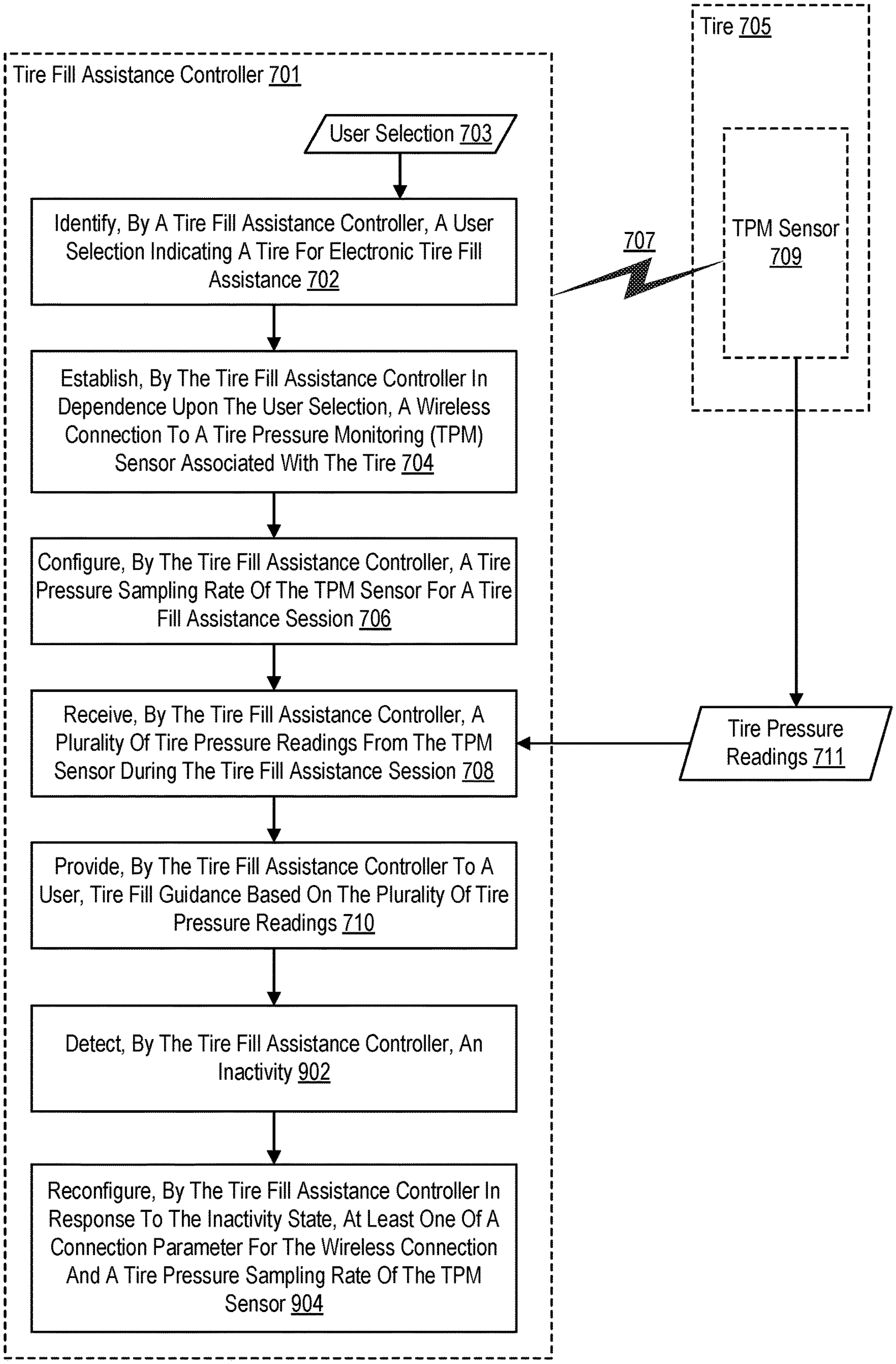
FIG. 9 sets forth a flowchart of another example method for tire fill assistance session control in accordance with the present disclosure.

For further explanation, FIG. 9 sets forth a flow chart illustrating another exemplary method for tire fill assistance session control according to at least one embodiment of the present disclosure. The example method of FIG. 9 is similar to the example method of FIG. 7 in that the example method of FIG. 9 also includes the steps of FIG. 7. However, the method of FIG. 9 further includes detecting 902, by the tire fill assistance controller 701, an inactivity state. In some examples, the tire fill assistance controller 701 detects 902 an inactivity state for the ETFA session by determining that a user is no longer interacting with an ETFA user interface and that the tire 705 is not inflating. For example, the tire fill assistance controller 701 may detect 902 the inactivity state by determining that an ETFA user interface is no longer displayed on the active screen of a smart device. In another example, the tire fill assistance controller 701 may detect 902 the inactivity state by determining that an ETFA application has been moved to background execution on the smart device. In yet another example, the tire fill assistance controller 701 may detect 902 the inactivity state by determining that the smart device is in a lock screen state. It will be appreciated that, when the tire fill assistance controller 701 is embodied in a smart device operated by a user, the smart device can detect that the user is no longer interacting with an ETFA application based on a variety of other factors, such as whether the user is actively using a different application, on a phone call, in motion, and so on. In some examples, the tire fill assistance controller 701 further detects 902 the inactivity state for the ETFA session by determining that a user is no longer inflating the tire 705. For example, the tire fill assistance controller 701 may determine, based on the tire pressure readings 711, that the tire 705 is not being inflated.

The method of FIG. 9 also includes reconfiguring 904, by the tire fill assistance controller 701 in response to the inactivity state, at least one of a connection parameter for the wireless connection 707 and a tire pressure sampling rate of the TPM sensor 709. For example, the connection parameter may be a connection interval parameter or peripheral latency parameter. To conserve battery power in the TPM sensor 709, the tire fill assistance controller 701 can configure the TPM sensor 709 to either reduce the rate at which the TPM sensor 709 transmits data or reduce the rate at which the TPM sensor 709 samples tire pressure, or both. If the user is not actively interacting with the ETFA user interface or the tire fill assistance controller 701 is inactive, or if the user is not actively inflating the tire, there is no need for the TPM sensor 709 to rapidly update the tire fill assistance controller 701.

In some examples, the tire fill assistance controller 701 reconfigures 904 the connection parameter for the wireless connection 707 by sending a connection parameter update message to the TPM sensor 709. For example, the connection parameter update message specifies a new connection interval value or a new peripheral latency value. In one example, the new connection interval value is the maximum connection interval allowed under the protocol (e.g., BLE protocol) employed by the wireless connection 707. As discussed above, in some examples the TPM sensor is configured to sample the tire pressure at a rate corresponding to the connection interval. In such examples, reconfiguring the connection interval also reconfigures the tire pressure sampling rate. In other examples, the tire fill assistance controller 701 reconfigures 904 the tire pressure sampling rate by sending a message that indicates a new tire pressure sampling rate value. In some examples, the tire fill assistance controller 701 may disable tire pressure indications altogether, such that the TPM sensor 709 does not include tire pressure readings in connection event messages, thus reducing the size of the data packets and thus reducing the amount of power needed to transmit those data packets.

Figure 10:
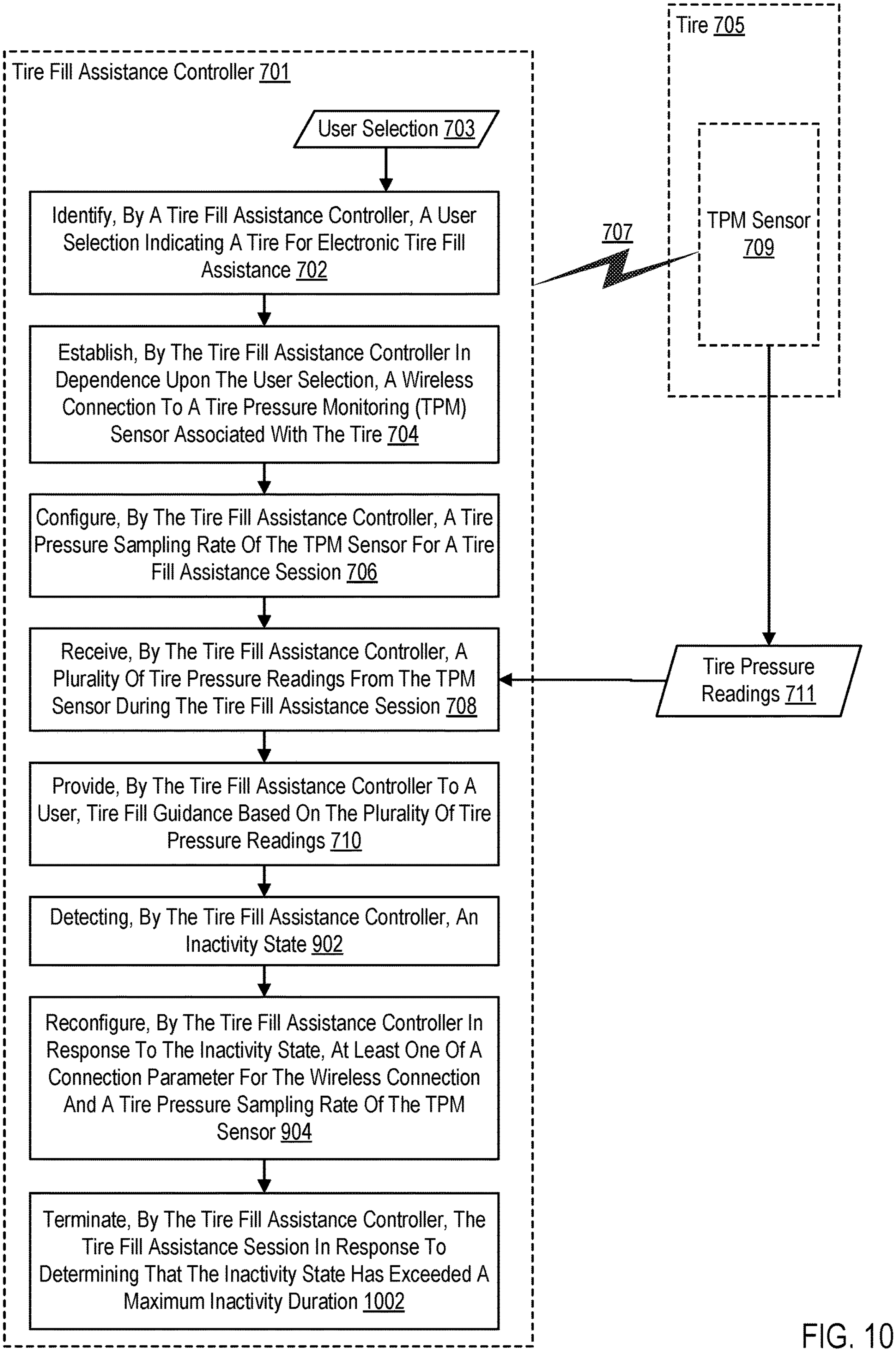
FIG. 10 sets forth a flowchart of another example method for tire fill assistance session control in accordance with the present disclosure.

For further explanation, FIG. 10 sets forth a flow chart illustrating another exemplary method for tire fill assistance session control according to at least one embodiment of the present disclosure. The example method of FIG. 10 is similar to the example method of FIG. 9) in that the example method of FIG. 10 also includes the steps of FIG. 9. However, the method of FIG. 10 further includes terminating 1002, by the tire fill assistance controller 701, the electronic tire fill assistance session in response to determining that the inactivity state has exceeded a maximum inactivity state duration. In some examples, the tire fill assistance controller 701 measures the length of time that the electronic tire fill assistance session is in an inactive state. In such examples, when the length of time that the electronic tire fill assistance session is in an inactive state reaches a predetermined maximum inactivity state duration, the tire fill assistance controller 701 terminates the electronic tire fill assistance session. In some examples, terminating the electronic tire fill assistance session includes sending a message to the TPM sensor 709 that closes the electronic tire fill assistance session, and terminating the wireless connection 707. For example, when the TPM sensor 709 receives a message that closes the electronic tire fill assistance session, the TPM sensor 709 transitions out of an electronic tire fill assistance mode and returns to a previous operational mode. For example, the TPM sensor 709 may begin broadcasting connectable or non-connectable advertisements and decrease the rate of tire pressure sampling.

Figure 11:
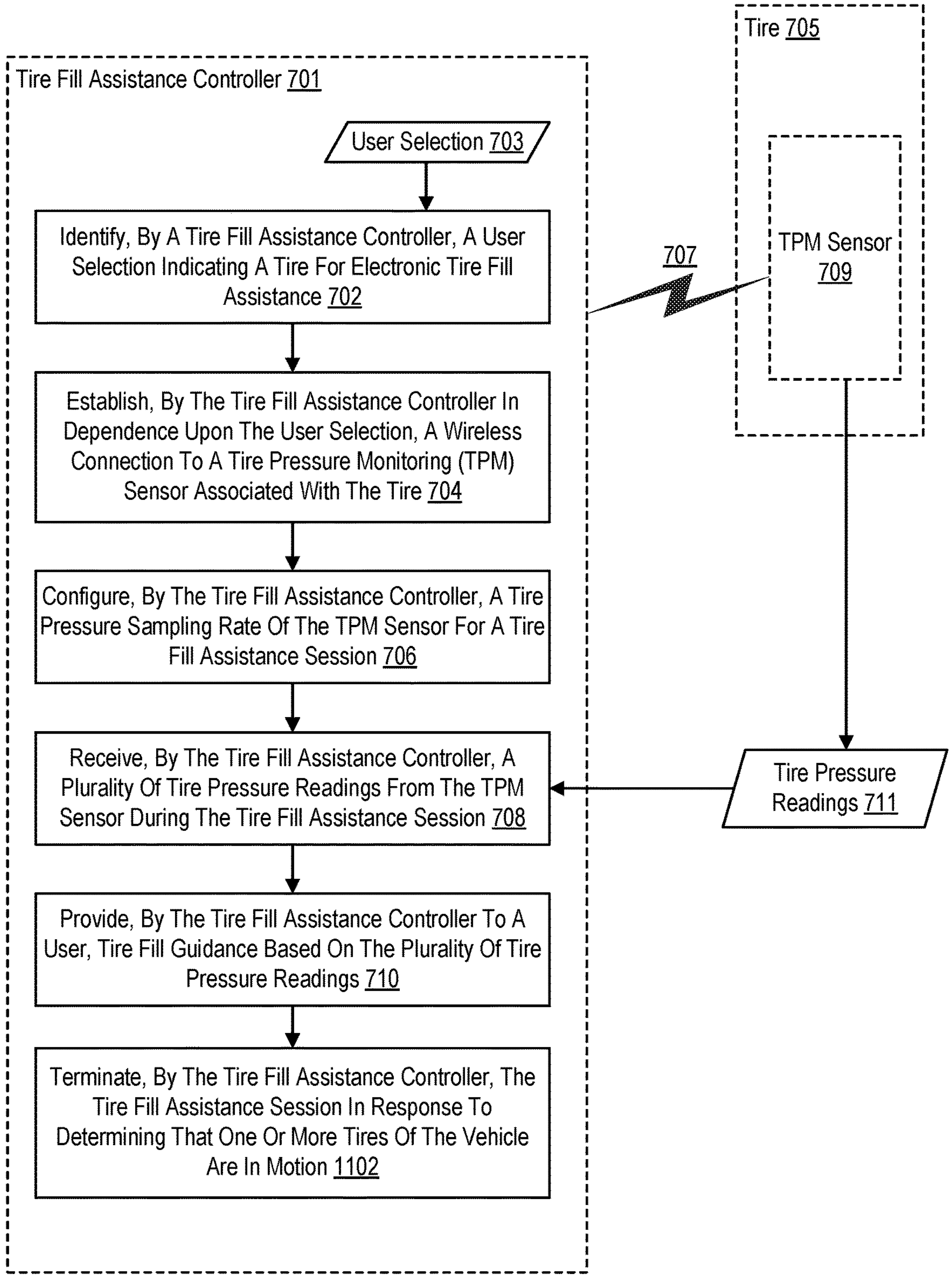
FIG. 11 sets forth a flowchart of another example method for tire fill assistance session control in accordance with the present disclosure.

For further explanation, FIG. 11 sets forth a flow chart illustrating another exemplary method for tire fill assistance session control according to at least one embodiment of the present disclosure. The example method of FIG. 11 is similar to the example method of FIG. 7 in that the example method of FIG. 11 also includes the steps of FIG. 7. However, the method of FIG. 11 further includes terminating 1102, by the tire fill assistance controller 701, the tire fill assistance session in response to determining that one or more tires of the vehicle are in motion.

It may be the case the user forgets to close the tire fill assistance session and begins driving the vehicle. However, in such a case the TPM sensor 709 is still connected to the tire fill assistance controller 701 and is therefore not advertising a connection. As such, the vehicle (e.g., the TPM ECU or other vehicle control system) cannot reestablish a connection to the TPM sensor 709 or otherwise obtain tire pressure measurements for the tire 705, which can be dangerous. To address this, the tire fill assistance controller 701 terminates 1102 the tire fill assistance session in response to determining that one or more tires of the vehicle are in motion. In some examples, the TPM sensor 709 includes a motion detection sensor such as a shock sensor, gyroscope, or accelerometer. In such examples, the TPM sensor 709 may include data in a connection event message indicating that the tire 705 is in motion. In such examples, the tire fill assistance controller 701 determines that one or more tires of the vehicle are in motion when the tire fill assistance controller 701 receives a connection event message that indicates the tire is in motion. In other examples, the tire fill assistance controller 701 determines that the vehicle is in motion by receiving a message from the vehicle control system indicating that the vehicle is in motion. For example, a smart device that includes the tire fill assistance controller 701 may receive a push notification (e.g., over a cellular communications network or other sideband communications) indicating that the vehicle is motion. In some cases, TPM sensors that are not active in a tire fill assistance session may be configured to include such motion detection data in the payload of an advertisement message. In such cases, the tire fill assistance controller 701 may determine that the vehicle is in motion by monitoring TPM sensor advertisements and identifying, from an advertisement, that one of the tires is in motion.

In some examples, terminating the electronic tire fill assistance session includes sending a message to the TPM sensor 709 that closes the electronic tire fill assistance session and terminating the wireless connection 707. For example, when the TPM sensor 709 receives a message that closes the electronic tire fill assistance session, the TPM sensor 709 transitions out of an electronic tire fill assistance mode and returns to a previous operational mode. For example, the TPM sensor 709 may begin broadcasting connectable or non-connectable advertisements and decrease the rate of tire pressure sampling.

Figure 12:
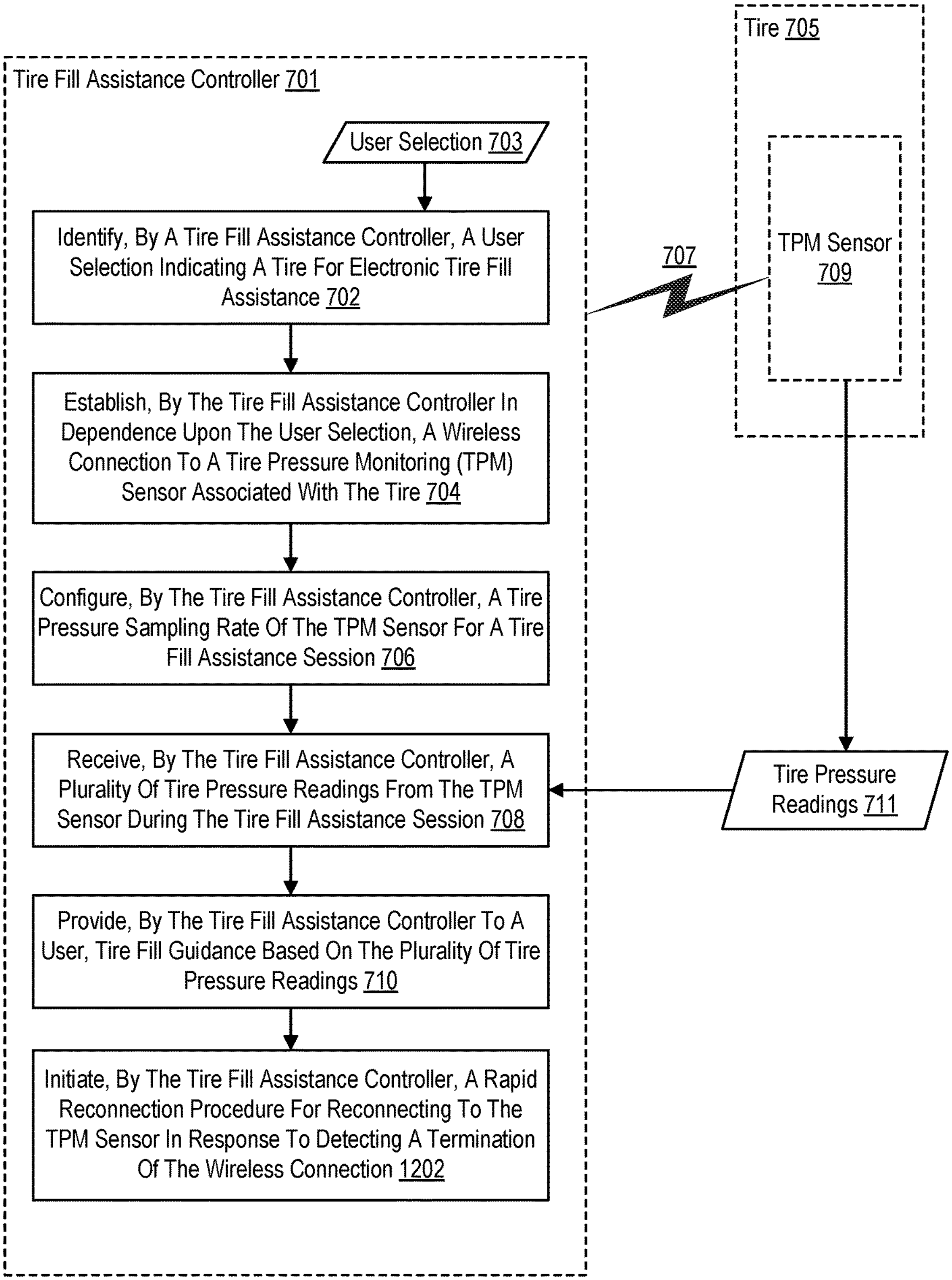
FIG. 12 sets forth a flowchart of another example method for tire fill assistance session control in accordance with the present disclosure.

For further explanation, FIG. 12 sets forth a flow chart illustrating another exemplary method for tire fill assistance session control according to at least one embodiment of the present disclosure. The example method of FIG. 12 is similar to the example method of FIG. 7 in that the example method of FIG. 12 also includes the steps of FIG. 7.

In some cases, the wireless connection 707 may be dropped due to interference, transition to a low power mode, moving out of range, or terminated inadvertently. Accordingly, the method of FIG. 12 includes initiating 1202, by the tire fill assistance controller 701, a rapid reconnection procedure for reconnecting to the TPM sensor 709 in response to detecting a termination of the wireless connection 707. In some examples, when the tire fill assistance controller 701 detects that the wireless connection 707 has terminated, the tire fill assistance controller 701 initiates 1202 a rapid reconnection procedure by increasing a scan rate at which the tire fill assistance controller 701 scans for advertisements from TPM sensors. In some examples, the TPM sensor 709, upon also detecting an early termination of the wireless connection 707, may increase the rate at which it broadcasts advertisement messages. Thus, the tire fill assistance controller 701 can use the rapid reconnection procedure to quickly reestablish the wireless connection 707 to avoid a disruption to the tire fill procedure.

Figure 13:
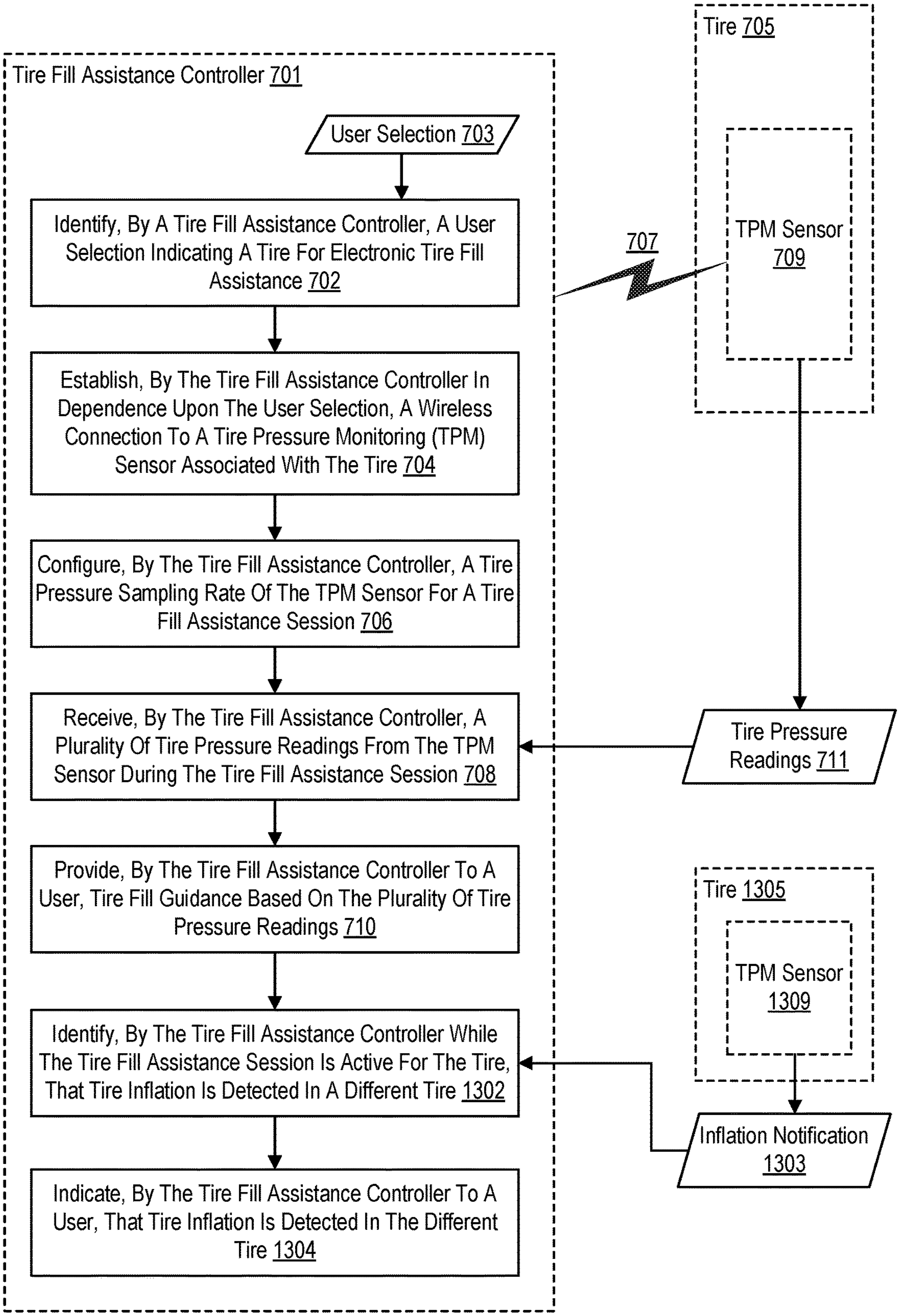
FIG. 13 sets forth a flowchart of another example method for tire fill assistance session control in accordance with the present disclosure.

For further explanation, FIG. 13 sets forth a flow chart illustrating another exemplary method for tire fill assistance session control according to at least one embodiment of the present disclosure. The example method of FIG. 13 is similar to the example method of FIG. 7 in that the example method of FIG. 13 also includes the steps of FIG. 7. However, the method of FIG. 13 further includes identifying 1302, by the tire fill assistance controller 701 while the tire fill assistance session is active for the tire 705, that tire inflation is detected in a different tire 1305. As discussed above, the tire fill assistance controller 701 may continue to monitor TPM advertisement messages even when the tire fill assistance controller 701 is in an active tire fill assistance session with a TPM sensor 709. For example, the tire fill assistance controller 701 includes an ETFA application, the advertisement messages of TPM sensors may be monitored as long as the ETFA application is executing. In some examples, the tire fill assistance controller 701 identifies 1302 that tire inflation is detected in a different tire 1305 by identifying an inflation notification 1303 from a TPM sensor 1309 associated with the different tire 1305. For example, the inflation notification 1303 may be an advertisement message that includes a flag, reason code or other indication that the tire 1305 is being inflated.

The method of FIG. 13 also includes indicating 1304, by the tire fill assistance controller 701 to a user, that tire inflation is detected in the different tire 1305. In some examples, the tire fill assistance controller 701 indicates 1304 that tire inflation is detected on the different tire 1305 by displaying a notification or message in a tire fill assistance user interface indicating that tire inflation is detected in a tire 1305 that is different from the tire 705 for which the tire fill assistance session is currently active. In some examples, a message by the tire fill assistance controller 701 prompts the user to close the tire fill assistance session for the previous tire 705 and initiate a tire fill assistance session for the new tire 1305. When the user selects the new tire 1305, the tire fill assistance controller 701 establishes a wireless connection for a tire fill assistance session with the TPM sensor 1309 associated with that tire 1305 through the procedure discussed above.

Figure 14:
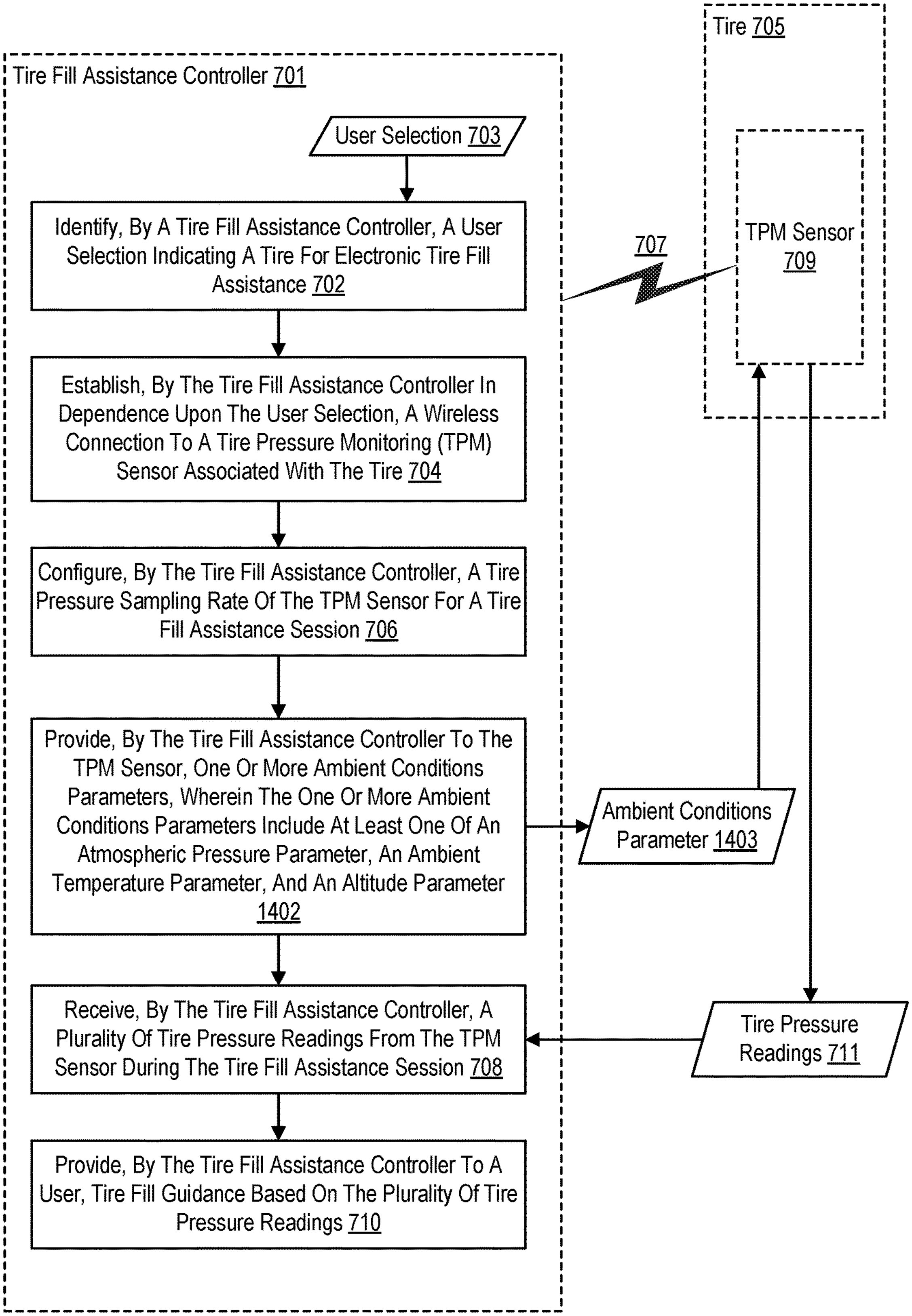
FIG. 14 sets forth a flowchart of another example method for tire fill assistance session control in accordance with the present disclosure.

For further explanation, FIG. 14 sets forth a flow chart illustrating another exemplary method for tire fill assistance session control according to at least one embodiment of the present disclosure. The example method of FIG. 14 is similar to the example method of FIG. 7 in that the example method of FIG. 14 also the steps of FIG. 7. To provide the most accurate tire pressure measurement, the TPM sensor 709 should be provided with the ambient temperature, ambient atmospheric pressure, and altitude of the tire 705. Accordingly, the method of FIG. 14 further includes providing 1402, by the tire fill assistance controller 701 to the TPM sensor 709, one or more ambient conditions parameters 1403, wherein the one or more ambient conditions parameters 1403 include at least one of an atmospheric pressure parameter, an ambient temperature parameter, and an altitude parameter. In some examples, the tire fill assistance controller 701 provides 1402 one or more ambient conditions parameters 1403 by transmitting a message to the TPM sensor that includes the ambient conditions parameter 1403.

In some examples, the tire fill assistance controller 701 identifies an ambient temperature and/or an ambient atmospheric pressure from weather data provided by a weather data provider based on a geographic location of the tire fill assistance controller 701. For example, where the tire fill assistance controller 701 is included in a smart device, the weather data may be obtained from the weather data provider through an internet connection over a cellular communications interface. The weather data may be obtained based on a geographic location acquired using a GPS receiver of the smart device. Thus, the weather data provider may be a web service that includes an API to provide weather data based on a supplied geographic location. In other implementations, the tire fill assistance controller 701 is coupled to sensors to detect ambient temperature and/or ambient atmospheric pressure.

In some examples, the tire fill assistance controller 701 identifies an altitude based on a geographic location of the tire fill assistance controller 701 and topographical data or elevation data for that geographic location. For example, where the tire fill assistance controller 701 is included in a smart device, the altitude may be obtained from a map data provider through a cellular communications interface. The map data may be based on a geographic location determined using a GPS receiver of the smart device. The map data provider may be a web service that includes an API to receive altitude or elevation data based on a supplied geographic location. In other implementations, the tire fill assistance controller 701 is coupled to an altimeter or other device that estimates altitude or elevation.

Figure 15:
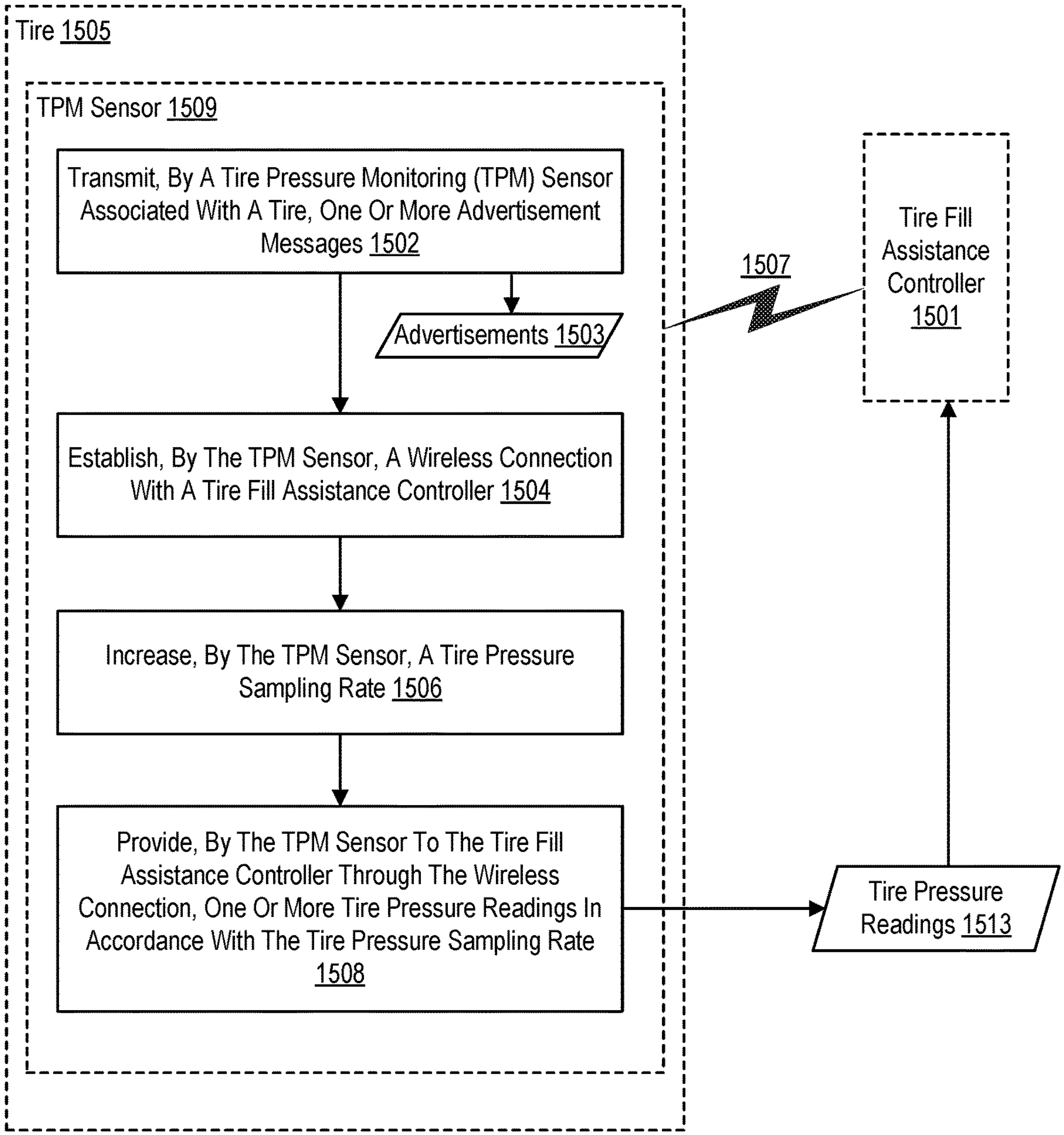
FIG. 15 sets forth a flowchart of another example method for tire fill assistance session control in accordance with the present disclosure.

For further explanation, FIG. 15 sets forth a flow chart illustrating an exemplary method for tire fill assistance session control according to at least one embodiment of the present disclosure that includes transmitting 1502, by a tire pressure monitoring (TPM) sensor 1509 associated with a tire 1505, one or more advertisement messages 1503. In some implementations, the TPM sensor 1509 is similar to the TPM sensor 600 of FIG. 6 in that the TPM sensor 1509 may include some or all of the components of the TPM sensor 600 of FIG. 6, but may also include additional components. For example, the TPM sensor includes at least a transceiver. In some examples, the transceiver is configured for BLE communication. In such examples, a controller of the TPM sensor 1509 is adapted for the BLE protocol, including generating and processing BLE protocol messages, packets, commands, and so on.

In some examples, the TPM sensor 1509 transmits 1502 one or more advertisement messages 1503 by transmitting one or more device discovery packets over one or more wireless communications channels. For example, the advertisement messages 1503 can be BLE connectable advertisements that are transmitted over one or more BLE communications channels designated for advertisements. In some examples, the advertisements include identifying information, such as a TPM device identifier and/or a tire location relative to the vehicle, as well as additional data such as an advertisement class or type, a reason code, a data payload, flags, and so on.

The example method of FIG. 15 also includes establishing 1504, by the TPM sensor 1509, a wireless connection 1507 with a tire fill assistance controller 1501. In some examples, the TPM sensor 1509 establishes 1507 the wireless connection 1507 by receiving a connection request from the tire fill assistance controller 1501. In some examples, the connection request is received from a tire fill assistance controller 1501 by receiving the request from a smart device that includes the tire fill assistance controller 1501 (e.g., the tire fill assistance controller 701 discussed above). In other examples, the TPM sensor 1509 receives 1504 the connection request from a vehicle-side tire fill assistance controller embedded in a vehicle control system. In response the connection request, the TPM sensor 1509 engages in a connection handshake procedure to connect the TPM sensor 1509 to the tire fill assistance controller 1501. In BLE implementations, the connection request message is a BLE connection request and the wireless connection 1507 is established in accordance with a BLE connection establishment protocol.

The example method of FIG. 15 also includes increasing 1506, by the TPM sensor 1509, a tire pressure sampling rate. A tire pressure sampling and/or reporting rate of the TPM sensor during standard operation is typically too low to provide accurate tire pressure measurements that can prevent the user from overfilling the tire before an alert can be signaled. An example tire pressure sampling rate during standard operation of the TPM sensor may be on the order of one sample every 10 seconds. An example tire pressure sampling rate optimal for ETFA may be on the order of one sample every 500 milliseconds. Thus, prior to the user initiating tire inflation, it is advantageous that the TPM sensor 1509 increase the tire pressure sampling rate.

In some examples, the TPM sensor 1509 automatically increases the tire pressure sampling rate to a preprogrammed tire pressure sampling rate that is utilized during a tire fill assistance session. In other examples, the TPM sensor 1509 receives a command from the tire fill assistance controller 1501 to update the tire pressure sampling rate to a specified value and increases the tire pressure sampling rate to that value. In still other examples, the TPM sensor 1509 updates the tire pressure sampling rate based on the connection interval. As mentioned above, wireless connection protocols such as the BLE protocol may keep the connection alive using periodic connection event messages. These keep-alive messages are transmitted in accordance with a connection interval parameter that specifies how often the connection messages are transmitted. Thus, in some examples, the TPM sensor 1509 is configured to match a tire pressure sampling rate to a connection interval parameter for the wireless connection 1507. For example, if the connection interval is 500 milliseconds, the TPM sensor 1509 increases the tire pressure sampling rate to once per 500 milliseconds. Thus, if the connection interval changes, the tire pressure sampling rate changes accordingly.

The method of FIG. 15 also includes providing 1508, by the TPM sensor 1509 to the tire fill assistance controller 1501 through the wireless connection 1507, one or more tire pressure readings 1513 in accordance with the tire pressure sampling rate. The TPM sensor 1509 samples signals from a pressure sense element in the TPM sensor 1509 in accordance with the tire pressure sampling rate parameter stored on the TPM sensor. In some examples, the TPM sensor 1509 provides 1508 a tire pressure reading 1513 by generating a connection event packet that includes the tire pressure reading as a data payload and transmitting the connection event packet to the tire fill assistance controller 1501 over the wireless connection 1507 at the configured connection interval. Thus, in such examples, at each connection interval, a signal from the pressure sense element is sampled and a message including the tire pressure reading is transmitted to the tire fill assistance controller 1501.

Figure 16:
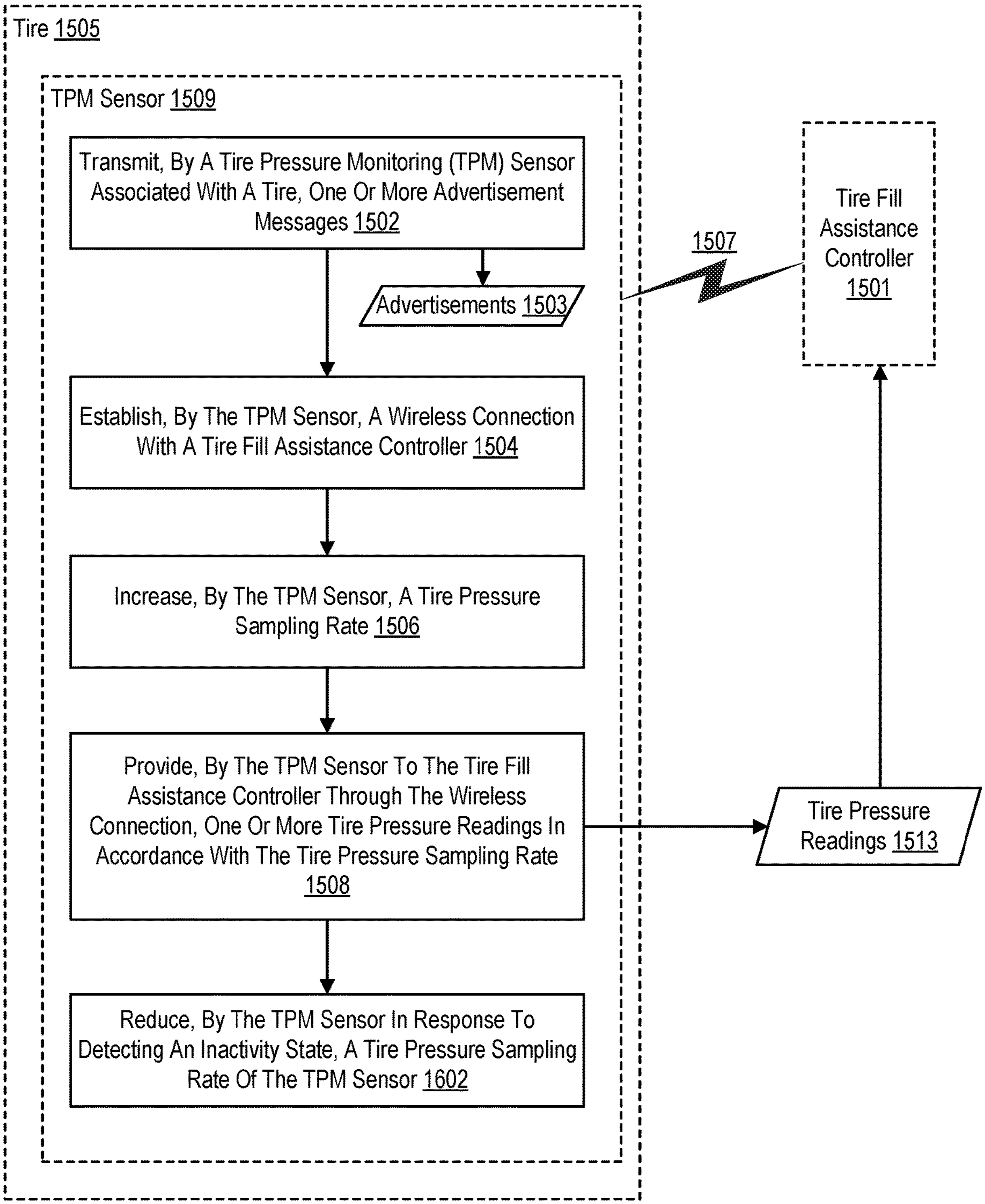
FIG. 16 sets forth a flowchart of another example method for tire fill assistance session control in accordance with the present disclosure.

For further explanation, FIG. 16 sets forth a flow chart illustrating another exemplary method for tire fill assistance session control according to at least one embodiment of the present disclosure. The example method of FIG. 16 is similar to the example method of FIG. 15 in that the method of FIG. 16 also includes the steps of FIG. 15. However, the method of FIG. 16 further includes reducing 1602, by the TPM sensor 1509 in response to detecting an inactivity state, a tire pressure sampling rate of the TPM sensor 1509. As discussed above, an inactivity state can include a state where the tire 1505 is not being inflated. Such a state may be detected by observing no change in tire pressure for a predetermined length of time. Thus, to conserve battery power, the TPM sensor 1509 reduces the tire pressure sampling rate based on the inactivity state. For example, the tire pressure sampling rate may be decreased such that a sampling interval corresponds to a maximum connection event interval as specified by the connection protocol used for the wireless connection 1507. In some examples, the TPM sensor 1509 also sends a message to the tire fill assistance controller 1501 requesting that the connection interval be increased to the maximum interval for connection event messages. In other examples, the connection interval does not change but the tire pressure sampling rate is decreased in response to the inactivity state. When tire inflation is subsequently detected, the TPM sensor 1509 can return to the previously configured tire pressure sampling rate used when the tire fill assist session is in the active state.

Figure 17:
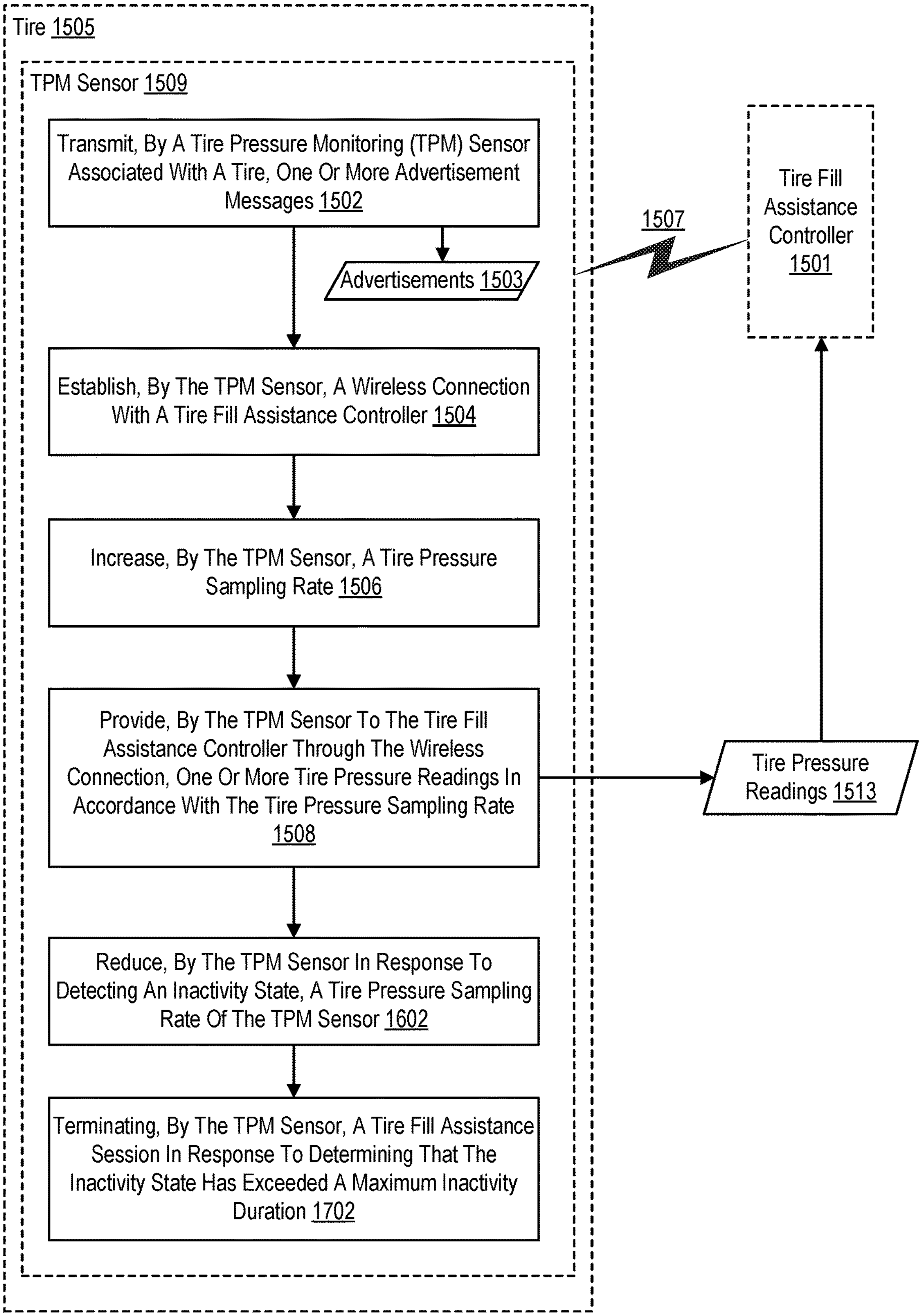
FIG. 17 sets forth a flowchart of another example method for tire fill assistance session control in accordance with the present disclosure.

For further explanation, FIG. 17 sets forth a flow chart illustrating another exemplary method for tire fill assistance session control according to at least one embodiment of the present disclosure. The example method of FIG. 17 is similar to the example method of FIG. 16 in that the method of FIG. 17 also includes the steps of FIG. 16. The method of FIG. 17 further includes terminating 1702, by the TPM sensor 1509, a tire fill assistance session in response to determining that the inactivity state has exceeded a maximum inactivity duration. In some examples, the TPM sensor 1509 measures the length of time that the electronic tire fill assistance session is in an inactive state. In such examples, when the length of time that the electronic tire fill assistance session is in an inactive state reaches a predetermined maximum inactivity state duration, the TPM sensor 1509 terminates the electronic tire fill assistance session. In some examples, terminating the electronic tire fill assistance session includes sending a message to the tire fill assistance controller 1501 that closes the electronic tire fill assistance session and terminating the wireless connection 1507.

Figure 18:
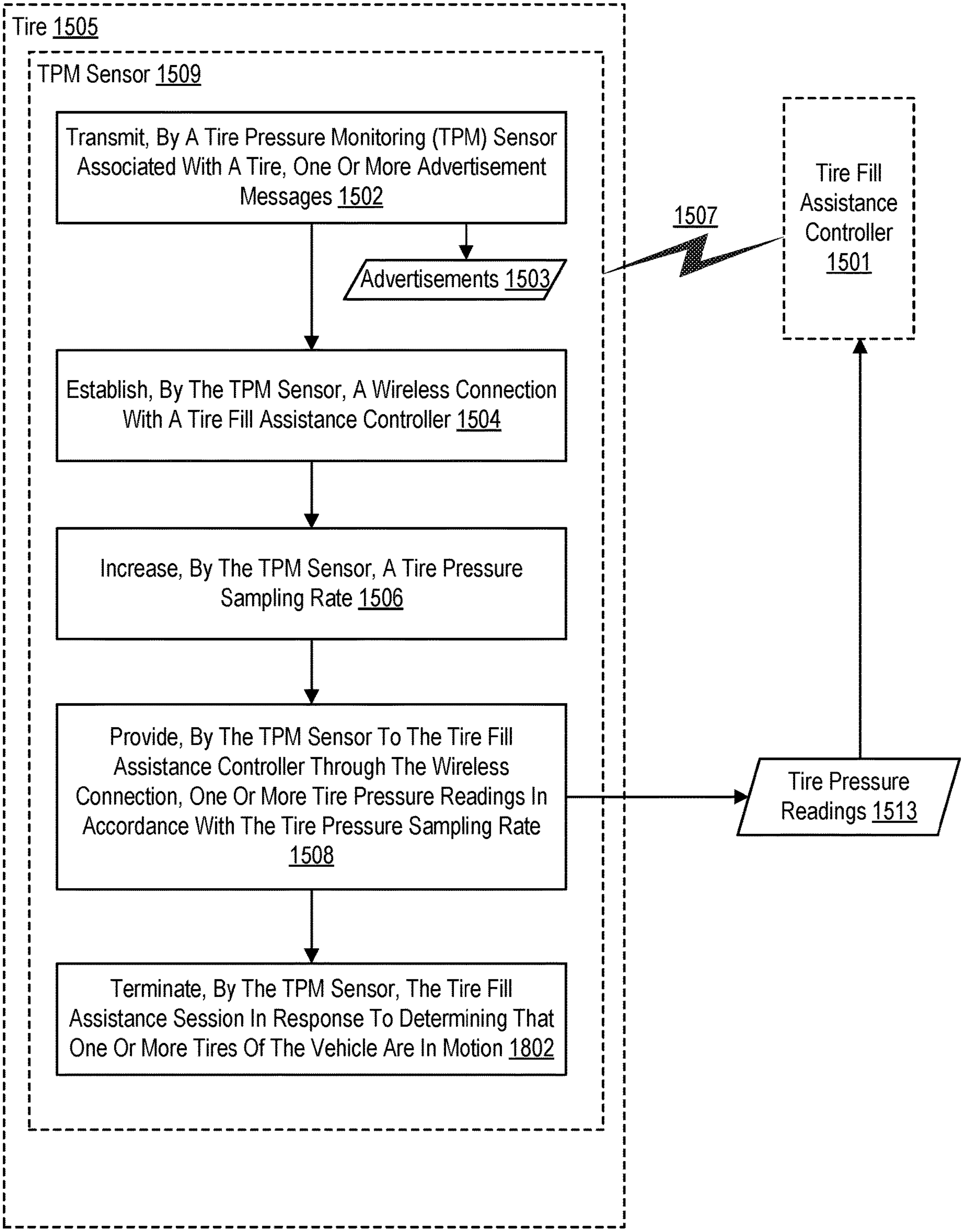
FIG. 18 sets forth a flowchart of another example method for tire fill assistance session control in accordance with the present disclosure.

For further explanation, FIG. 18 sets forth a flow chart illustrating another exemplary method for tire fill assistance session control according to at least one embodiment of the present disclosure. The example method of FIG. 18 is similar to the example method of FIG. 15 in that the method of FIG. 18 also includes the steps of FIG. 15. However, the method of FIG. 18 further includes terminating 1802, by the TPM sensor 1509, a tire fill assistance session in response to determining that one or more tires of the vehicle are in motion.

As discussed above, it may be the case the user forgets to close the tire fill assistance session and begins driving the vehicle. However, the TPM sensor 1509 is still connected to the tire fill assistance controller 1501 and is therefore not advertising a connection. As such, the vehicle (e.g., the TPM ECU or other vehicle control system) cannot reestablish a connection to the TPM sensor 1509 or otherwise obtain tire pressure measurements for the tire 1505, which can be dangerous. Accordingly, the TPM sensor 1509 terminates 1802 a tire fill assistance session in response to determining that one or more tires of the vehicle are in motion. In some examples, the TPM sensor 1509 includes a motion detection sensor such as a shock sensor, gyroscope, or accelerometer. When motion is detected by the motion detection sensor, the TPM sensor 1509 sends a message to the tire fill assistance controller 1501 that closes the electronic tire fill assistance session, and terminates the wireless connection 1507. The TPM sensor 1509 can then resume broadcasting connectable or non-connectable advertisements.

Figure 19:
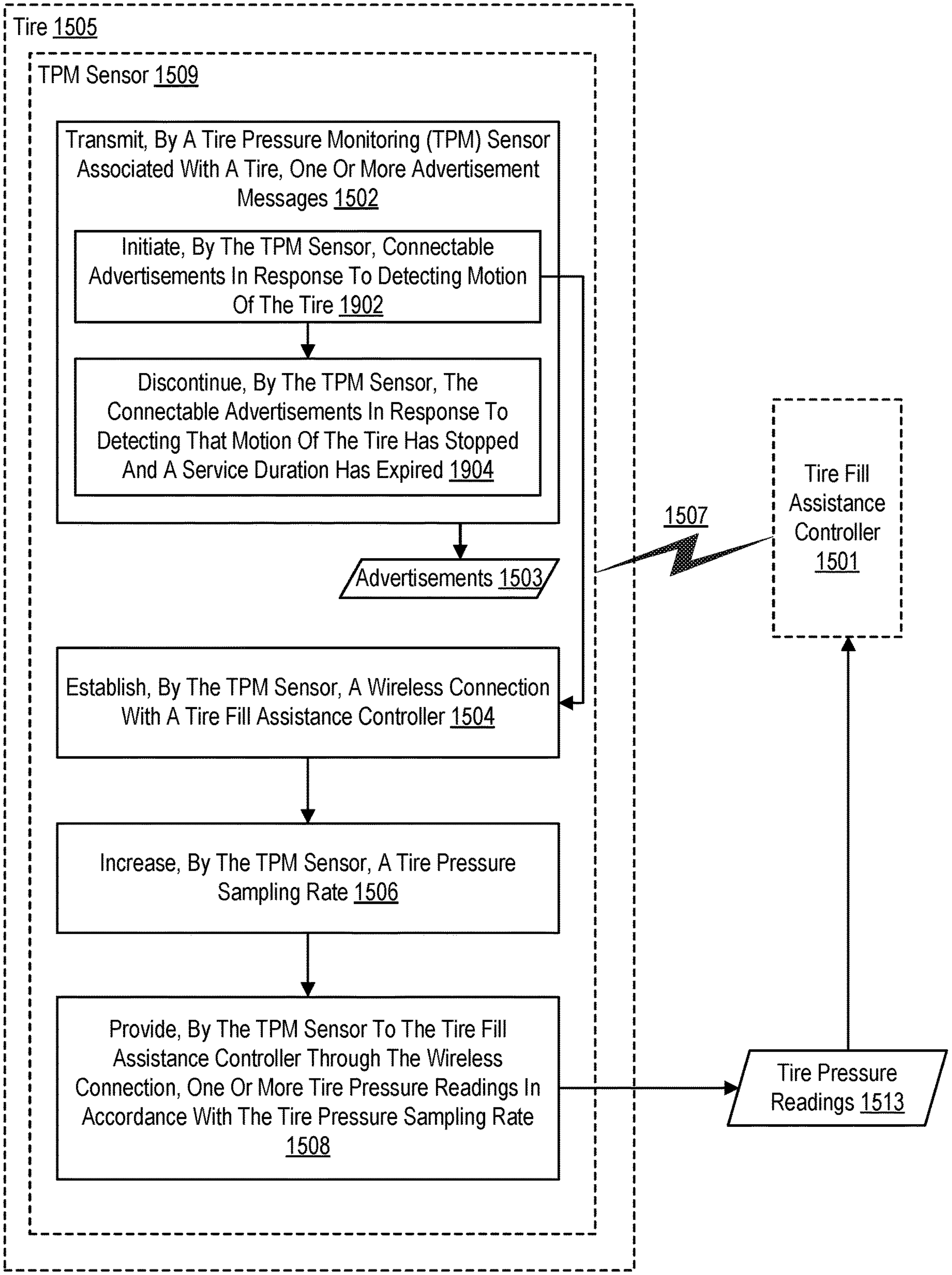
FIG. 19 sets forth a flowchart of another example method for tire fill assistance session control in accordance with the present disclosure.

For further explanation, FIG. 19 sets forth a flow chart illustrating another exemplary method for tire fill assistance session control according to at least one embodiment of the present disclosure. The example method of FIG. 19 is similar to the example method of FIG. 15 in that the method of FIG. 19 also includes the steps of FIG. 15. In the example method of FIG. 19, transmitting 1502, by a tire pressure monitoring (TPM) sensor 1509 associated with a tire 1505, one or more advertisement messages 1503 includes initiating 1902, by the TPM sensor 1509, connectable advertisements in response to detecting motion of the tire. A vehicle typically spends more time stationary than in motion, such as when the vehicle is parked overnight. To conserve battery power, the TPM sensor 1509 may transition to broadcasting infrequent non-connectable advertisements after the vehicle has been stationary and/or the engine has been off for a period of time. However, when the vehicle starts driving again the vehicle control system will need to acquire tire pressure readings from the TPM sensor 1509.

In some examples, the TPM sensor 1509 initiates 1902 connectable advertisements by wirelessly transmitting advertisement messages or other discovery messages indicating that the TPM sensor 1509 is available for connection. This facilitates, for example, establishment of a connection between the vehicle control system and the TPM sensor 1509. In some examples, the connectable advertisements are broadcast at a rapid rate, where the rapid rate is defined as a transmission rate that is faster than a typical transmission rate at which connection advertisements are broadcast. For example, if the typical transmission rate of connection advertisements under normal conditions is once per second, a rapid transmission rate may be once per 500 milliseconds. In some examples, the rapid transmission rate is the maximum rate within the communications protocol (e.g., BLE protocol) that connection advertisements can be broadcast. Thus, the TPM sensor 1509 initiates rapid connectable advertisements by increasing the transmission rate that connectable advertisements are broadcast beyond a previous transmission rate.

It is advantageous to continue the connection advertisements after the vehicle has stopped moving or the engine is turned off to allow the user to easily establish an ETFA session with the TPM sensor 1509. In some examples, connectable advertisements may continue for service duration after the vehicle is stopped. As a non-limiting example, the service duration may be 10 minutes. Accordingly, in the example method of FIG. 19, transmitting 1502, by a tire pressure monitoring (TPM) sensor 1509 associated with a tire 1505, one or more advertisement messages 1503 also includes discontinuing 1904, by the TPM sensor 1509, the connectable advertisements in response to detecting that motion of the tire 1505 has stopped and a service duration has expired. In some examples, the TPM sensor 1509 stores a service duration parameter that indicates an amount of time that connectable advertisements should continue after the vehicle has stopped. The TPM sensor 1509 can determine that the vehicle has stopped based on readings from the motion detection sensor in the TPM sensor 1509 or by receiving a message from the vehicle control system indicating that the vehicle has stopped or that the engine has turned off. In some examples, the TPM sensor 1509 discontinues 1904 the connectable advertisements by initiating a timer once the tire 1505 has stopped moving and halting the connectable advertisements once the amount of time corresponding to the service duration has elapsed on the timer. The TPM sensor 1509 may then transition to non-connectable advertisements at a lower transmission rate to conserve battery power. However, if the user initiates an ETFA session, as discussed above, during the service duration, the TPM sensor 1509 establishes a connection with the tire fill assistance controller 1501 through the procedure of FIG. 15.

Figure 20:
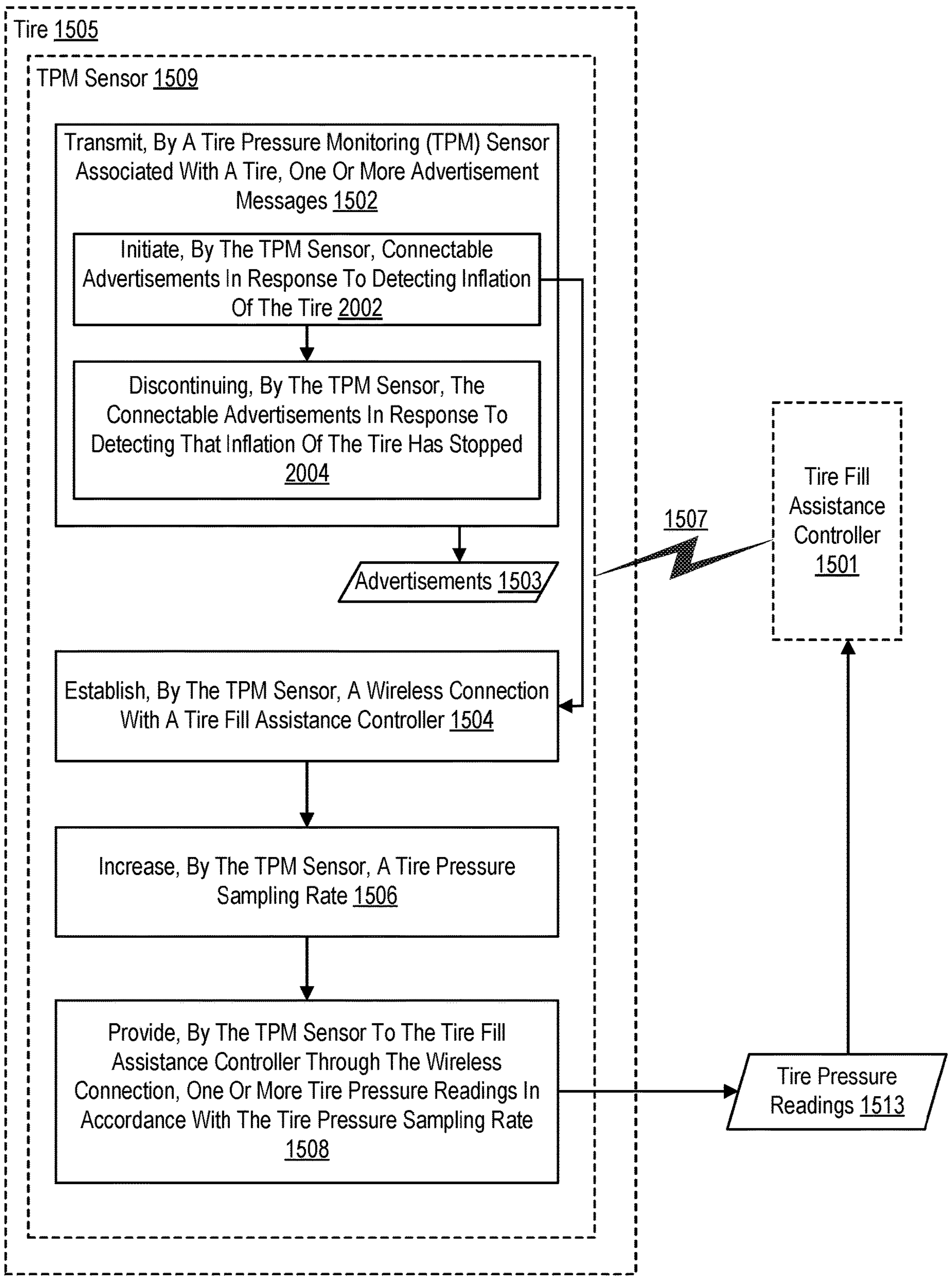
FIG. 20 sets forth a flowchart of another example method for tire fill assistance session control in accordance with the present disclosure.

For further explanation, FIG. 20 sets forth a flow chart illustrating another exemplary method for tire fill assistance session control according to at least one embodiment of the present disclosure. The example method of FIG. 20 is similar to the example method of FIG. 15 in that the method of FIG. 20 also includes the steps of FIG. 15. In example method of FIG. 20, transmitting 1502, by a tire pressure monitoring (TPM) sensor 1509 associated with a tire 1505, one or more advertisement messages 1503 includes initiating 2002, by the TPM sensor, connectable advertisements in response to detecting inflation of the tire 1505.

In some cases, the user may forget to select a tire for tire fill assistance before commencing with tire fill, and thus tire fill begins before a connection with the tire fill assistance controller 1501 is established. In such cases, the TPM sensor 1509 may interpret the commencement of tire inflation as the initiation of an ETFA session. Accordingly, the TPM sensor initiates 2002 connectable advertisements in response to detecting inflation of the tire 1505. In some examples, the TPM sensor 1509 initiates 2002 connectable advertisements by wirelessly transmitting advertisement messages or other discovery messages indicating that the TPM sensor 1509 is available for connection when a pressure change in the tire beyond a programmed pressure change threshold is detected. In some implementations, the connectable advertisements indicate the detected tire inflation through a flag, reason code, or other indicator, such that the tire fill assistance controller 1501 monitoring the advertisements will recognize that tire inflation has been detected in the tire to facilitate establishment of an ETFA session, as discussed above.

In some examples, the connectable advertisements are broadcast at a rapid transmission rate, where the rapid transmission rate is defined as a transmission rate that is faster than a typical transmission rate at which connection advertisements are broadcast. For example, if the typical transmission rate of connection advertisements under normal conditions is once per second, a rapid transmission rate may be once per 500 milliseconds. In some examples, the rapid transmission rate is the maximum rate within the communications protocol (e.g., BLE protocol) that connection advertisements can be broadcast. Thus, the TPM sensor 1509 initiates rapid connectable advertisements by increasing the transmission rate that connectable advertisements are broadcast beyond a previous transmission rate.

In the example method of FIG. 20, transmitting 1502, by a tire pressure monitoring (TPM) sensor 1509 associated with a tire 1505, one or more advertisement messages 1503 also includes discontinuing 2004, by the TPM sensor 1509, the connectable advertisements in response to detecting that inflation of the tire 1505 has stopped. In some examples, if the TPM sensor 1509 detects that tire inflation has stopped (e.g., no change in pressure for a designated amount of time) and a connection with the tire fill assistance controller 1501 has not been established, the TPM sensor 1509 discontinues 2004 the connectable advertisements by transitioning to broadcasting non-connectable advertisements to conserve battery power. However, if the user initiates an ETFA session, as discussed above, during tire inflation, the TPM sensor 1509 establishes a connection with the tire fill assistance controller 1501, as discussed above.

Figure 21:
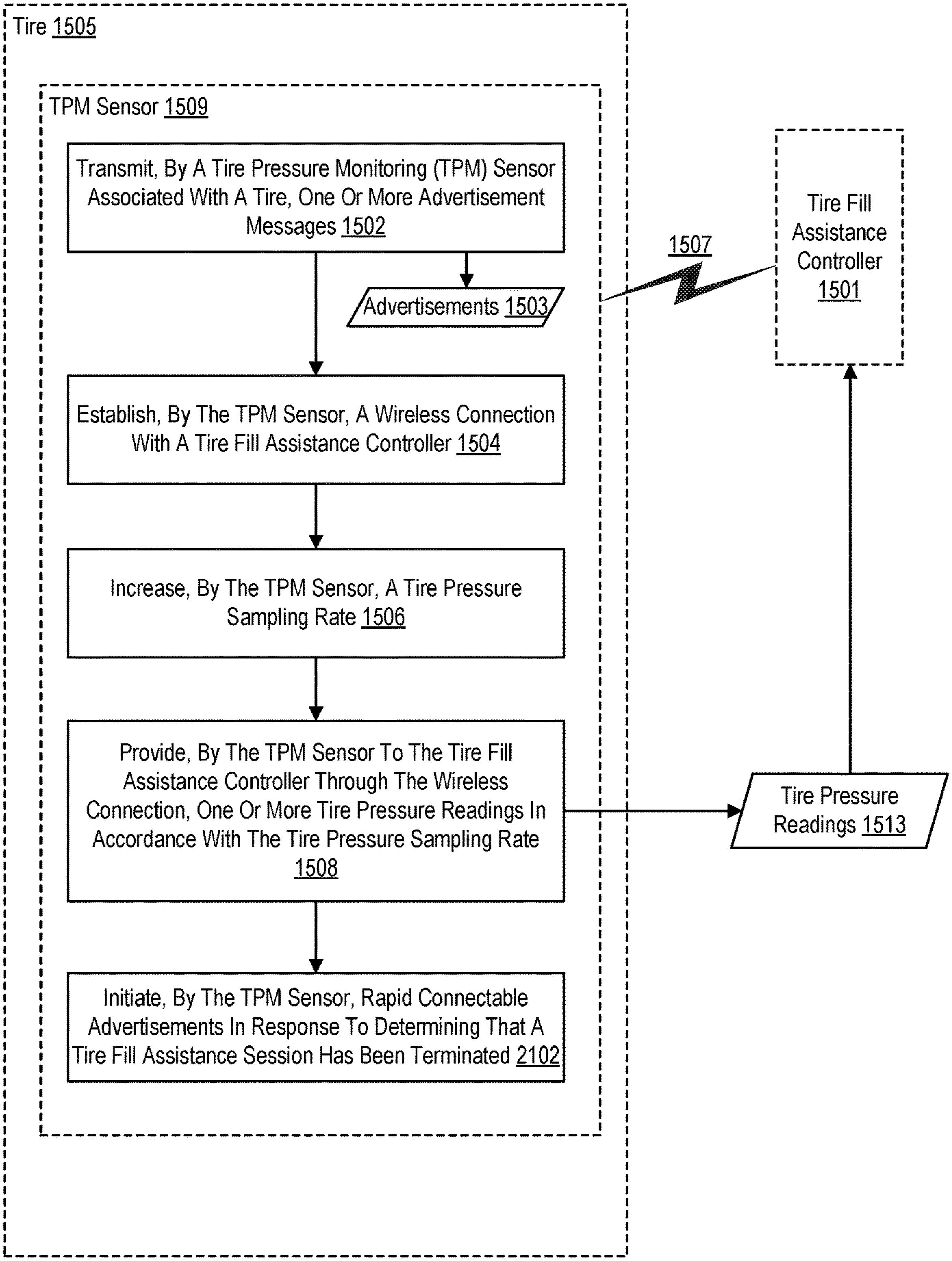
FIG. 21 sets forth a flowchart of another example method for tire fill assistance session control in accordance with the present disclosure.

For further explanation, FIG. 21 sets forth a flow chart illustrating another exemplary method for tire fill assistance session control according to at least one embodiment of the present disclosure. The example method of FIG. 21 is similar to the example method of FIG. 15 in that the method of FIG. 21 also includes the steps of FIG. 15. However, the method of FIG. 21 further includes initiating 2102, by the TPM sensor 1509, rapid connectable advertisements in response to determining that a tire fill assistance session has been terminated.

In some cases, the ETFA session between the TPM sensor 1509 and the tire fill assistance controller 1501 may be terminated inadvertently, due to interference, transition to low power mode, inactivity, and so on. In these cases, it is advantageous that the user can quickly reestablish the connection. In other cases, the user may terminate an ETFA session for a first tire to initiate another ETFA session for a second tire, but ultimately needs to return to the continue tire fill for the first tire. In such cases, it is also advantageous that the user can quickly reestablish a connection to a TPM sensor of a tire that has recently undergone tire fill. Accordingly, the TPM sensor 1509 initiates 2102 rapid connectable advertisements in response to determining that a tire fill assistance session has been terminated. In some examples, the TPM sensor 1509 initiates 2102 rapid connectable advertisements in response to determining that a tire fill assistance session has been terminated by broadcasting device discovery messages indicating that the TPM sensor 1509 is available for connection at a rapid transmission rate. In some examples, a rapid transmission rate is a transmission rate that is faster than a typical transmission rate at which connection advertisements are typically broadcast. For example, if the typical transmission rate of connection advertisements under normal conditions is once per second, a rapid transmission rate may be once per 500 milliseconds. In some examples, the rapid transmission rate is the maximum rate within the communications protocol (e.g., BLE protocol) that connection advertisements can be broadcast. This allows a connection to be quickly reestablished after it has been terminated. In some implementations, if the connection is not reestablished with a predetermined reestablishment duration, the 1509 discontinues broadcasting connectable advertisements at the rapid transmission rate.

In some cases, the user may adjust the tire pressures when the tires are warm (i.e., shortly after a drive). If the TPM sensor does not compensate the tire temperatures during pressure adjustment, the tires will not be adjusted to recommended cold tire pressures. Thus, when the tires cool down, they may be underinflated, and low-pressure warning may be displayed to the user. The tire temperature may be reported by a temperature sensor in the TPM sensor 1509. However, to compensate the tire temperature, the ambient temperature must also be known. The following Equation 1 may be used to calculate compensated placard pressure, where $P_T$ is the recommended inflation pressure at measured tire temperature T, $P_C$ is the recommended cold inflation pressure for the axel, and $T_{ambient}$ is the ambient temperature:

$$P_T = [(P_C + 101.3) * (T + 273)/(T_{ambient} + 273)] - 101.3 \quad \text{(Equation 1)}$$

However, the TPM sensor 1509 has no mechanism for measuring the ambient temperature outside of the tire.

Further, the TPM sensor 1509 should compensate atmospheric pressure during tire pressure measurement. During ETFA, the user relies on pressure readings from a TPM sensor which is mounted inside a tire (sealed gauge) compared to external inflation devices (vented gauge). While vented gauge devices naturally compensate atmospheric pressure, sealed gauge devices cannot know or compensate atmospheric pressure changes, but only assume that the device is at always sea level or based on calibration value of the sensor if it is different than sea level pressure. Without a change in altitude, using last known usable atmospheric pressure when usable information is no longer received is unlikely to cause problems when the system is subsequently updated with usable atmospheric pressure. However, with a change in altitude, using last known usable atmospheric pressure, when usable information is no longer received, could lead to significant deviations from a vented gauge reference and significant changes in displayed tire pressures or toggling of low tire pressure warning status. Thus, to ensure the most accurate tire pressure measurements, the TPM sensor 1509 should compensate the ambient atmospheric pressure. However, the TPM sensor 1509 has no mechanism for measuring the ambient atmospheric pressure outside of the tire.

In some cases, the last known atmospheric pressure can be used if the change in altitude is known. The following Equation 2 can be used to estimate the current atmospheric pressure P2 based on a the previously known atmospheric pressure, ambient temperature, and the change in altitude, where P1 is the last known atmospheric pressure (millibars), T1 is the ambient temperature associated with the last known atmospheric pressure (degrees Celsius), A1 is the altitude associated with the last known atmospheric pressure, and A2 is the current altitude:

$$P2 = P1 + P1 * \exp(-0.03416/T1) * (A2 - A1) \quad \text{(Equation 2)}$$

However, the TPM sensor 1509 has no mechanism for knowing the altitude of the tire.

Figure 22:
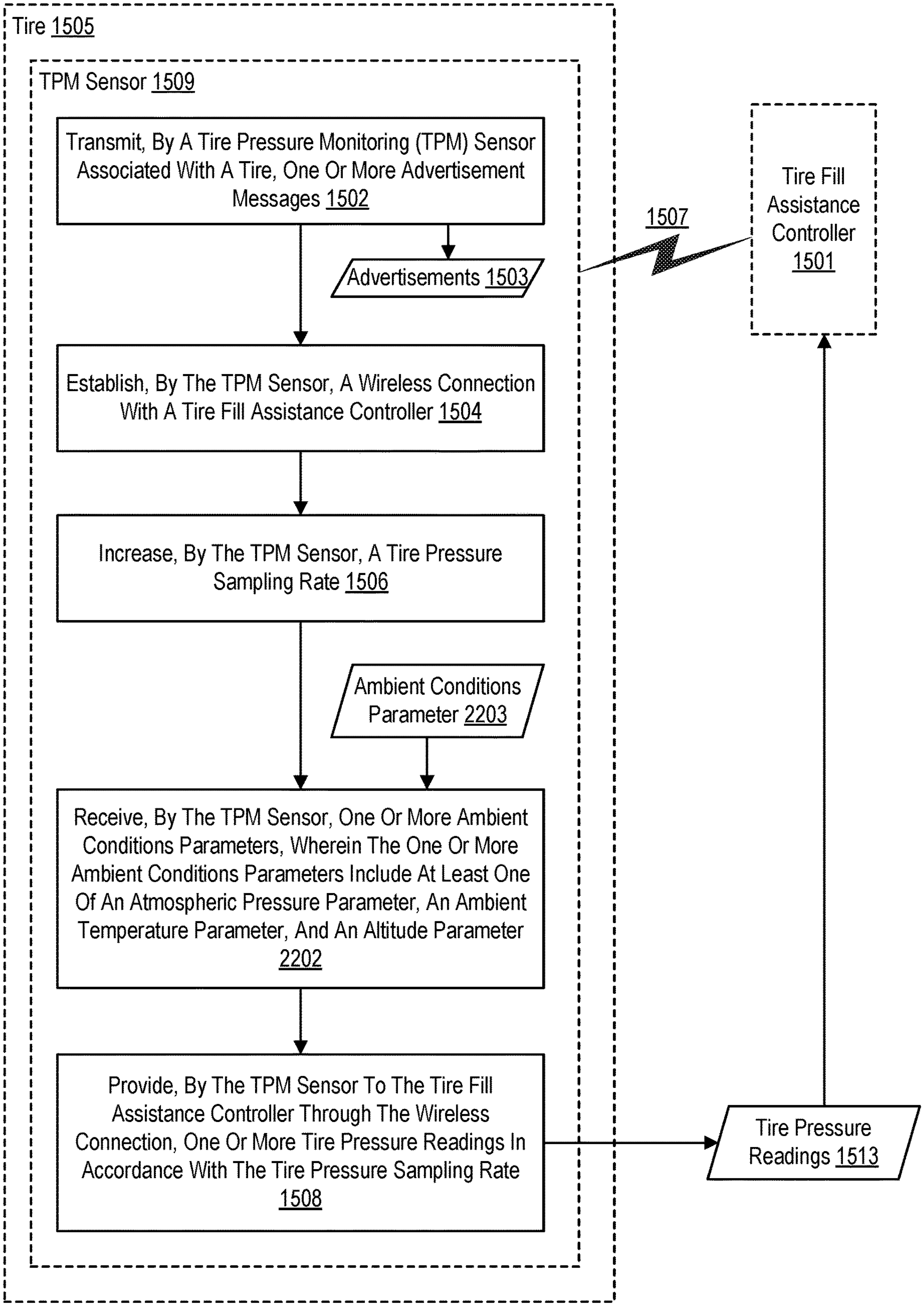
FIG. 22 sets forth a flowchart of another example method for tire fill assistance session control in accordance with the present disclosure.

To address the foregoing, FIG. 22 sets forth a flow chart illustrating another exemplary method for tire fill assistance session control according to at least one embodiment of the present disclosure. The example method of FIG. 22 is similar to the example method of FIG. 15 in that the method of FIG. 22 also includes the steps of FIG. 15. However, the method of FIG. 22 includes receiving 2202, by the TPM sensor 1509, one or more ambient conditions parameters 2203, wherein the one or more ambient conditions parameters 2203 include at least one of an atmospheric pressure parameter, an ambient temperature parameter, and an altitude parameter. In some examples, the TPM sensor 1509 receives 2202 one or more ambient conditions parameter 2203 in a message transmitted by the vehicle control system. For example, when the vehicle control system detects that the engine has been turned off, the vehicle control system may transmit a message over a wireless connection to the TPM sensor 1509. The message may indicate one or more of the ambient temperatures of the vehicle, the ambient temperature of the vehicle, or the altitude of the vehicle. The vehicle control system can determine these parameters from on-board sensors or by communicating with a remote server. In other examples, the TPM sensor 1509 receives 2202 one or more ambient conditions parameter 2203 in a message transmitted by a smart device. For example, a smart device that includes the tire fill assistance controller 1501 obtain one or more of the ambient temperatures of the location of the smart device, the ambient temperature of the location of the smart device, or the altitude of the location of the smart device based on a GPS coordinate location determined by the smart device. The tire fill assistance controller 1501 then transmits the one or more ambient conditions parameters over a wireless connection to the TPM sensor 1509. For example, the ambient conditions parameters can be received from the tire fill assistance controller 1501 during a negotiation of parameters for the ETFA session. The TPM sensor 1509 uses one or more of the ambient conditions parameters to calculate tire pressure for tire pressure readings that are provided to the tire fill assistance controller 1501.

Advantages and features of the present disclosure can be further described by the following statements:

1. A method of tire fill assistance session control, the method comprising: identifying, by a tire fill assistance controller, a user selection indicating a tire for electronic tire fill assistance; establishing, by the tire fill assistance controller in dependence upon the user selection, a wireless connection to a tire pressure monitoring (TPM) sensor associated with the tire; configuring, by the tire fill assistance controller, a tire pressure sampling rate of the TPM sensor for a tire fill assistance session; receiving, by the tire fill assistance controller, a plurality of tire pressure readings from the TPM sensor during the tire fill assistance session; and providing, by the tire fill assistance controller to a user, tire fill guidance based on the plurality of tire pressure readings.
2. The method of statement 1, wherein the tire pressure sampling rate is configured by the tire fill assistance controller prior to tire inflation.
3. The method of statement 2 or statement 1, wherein a smart device includes the tire fill assistance controller.
4. The method statement 3, statement 2, or statement 1 further comprising: identifying, by the tire fill assistance controller, that tire inflation is detected by the TPM sensor; and notifying the user that tire inflation is detected in the tire.
5. The method statement 4, statement 3, statement 2, or statement 1 further comprising: detecting, by the tire fill assistance controller, an inactivity state; and reconfiguring, by the tire fill assistance controller in response to the inactivity state, at least one of a connection parameter for the wireless connection and a tire pressure sampling rate of the TPM sensor.
6. The method statement 5, statement 4, statement 3, statement 2, or statement 1 further comprising: terminating, by the tire fill assistance controller, the tire fill assistance session in response to determining that the inactivity state has exceeded a maximum inactivity duration.
7. The method of statement 6, statement 5, statement 4, statement 3, statement 2, or statement 1 further comprising: terminating, by the tire fill assistance controller, the tire fill assistance session in response to determining that one or more tires of a vehicle are in motion.
8. The method of statement 7, statement 6, statement 5, statement 4, statement 3, statement 2, or statement 1 further comprising: initiating, by the tire fill assistance controller, a rapid reconnection procedure for reconnecting to the TPM sensor in response to detecting a termination of the wireless connection.
9. The method of statement 8, statement 7, statement 6, statement 5, statement 4, statement 3, statement 2, or statement 1 further comprising: identifying, by the tire fill assistance controller while the tire fill assistance session is active for the tire, that tire inflation is detected in a different tire; and indicating, by the tire fill assistance controller to a user, that tire inflation is detected in the different tire.
10. The method of statement 9, statement 8, statement 7, statement 6, statement 5, statement 4, statement 3, statement 2, or statement 1 further comprising: providing, by the tire fill assistance controller to the TPM sensor, one or more ambient conditions parameters, wherein the one or more ambient conditions parameters include at least one of an atmospheric pressure parameter, an ambient temperature parameter, and an altitude parameter.
11. A method of tire fill assistance session control, the method comprising: transmitting, by a tire pressure monitoring (TPM) sensor associated with a tire, one or more advertisement messages; establishing, by the TPM sensor, a wireless connection with a tire fill assistance controller; increasing, by the TPM sensor, a tire pressure sampling rate; and providing, by the TPM sensor to the tire fill assistance controller through the wireless connection, one or more tire pressure readings in accordance with the tire pressure sampling rate.

12. The method of statement 11, wherein the TPM sensor is mounted in the tire.
13. The method of statement 12 or statement 11, wherein a smart device includes the tire fill assistance controller.
14. The method of statement 13, statement 12, or statement 11 further comprising: reducing, by the TPM sensor in response to detecting an inactivity state, a tire pressure sampling rate of the TPM sensor.
15. The method of statement 14, statement 13, statement 12, or statement 11 further comprising: terminating, by the TPM sensor, a tire fill assistance session in response to determining that the inactivity state has exceeded a maximum inactivity duration.
16. The method of statement 15, statement 14, statement 13, statement 12, or statement 11 further comprising: terminating, by the TPM sensor, the tire fill assistance session in response to determining that one or more tires of a vehicle are in motion.
17. The method of statement 16, statement 15, statement 14, statement 13, statement 12, or statement 11, wherein transmitting, by a TPM sensor associated with a tire, one or more advertisement messages includes: initiating, by the TPM sensor, advertisements in response to detecting motion of the tire; and discontinuing, by the TPM sensor, the connectable advertisements in response to detecting that motion of the tire has stopped and a service duration has expired.
18. The method of statement 17 statement 16, statement 15, statement 14, statement 13, statement 12, or statement 11, wherein transmitting, by a TPM sensor associated with a tire, one or more advertisement messages includes: initiating, by the TPM sensor, connectable advertisements in response to detecting inflation of the tire; and discontinuing, by the TPM sensor, the connectable advertisements in response to detecting that inflation of the tire has stopped.
19. The method of statement 18, statement 17 statement 16, statement 15, statement 14, statement 13, statement 12, or statement 11 further comprising: initiating, by the TPM sensor, rapid connectable advertisements in response to determining that a tire fill assistance session has been terminated.
20. The method of statement 19, statement 18, statement 17 statement 16, statement 15, statement 14, statement 13, statement 12, or statement 11 further comprising: receiving, by the TPM sensor, one or more ambient conditions parameters, wherein the one or more ambient conditions parameters include at least one of an atmospheric pressure parameter, an ambient temperature parameter, and an altitude parameter.

Exemplary embodiments of the present invention are described largely in the context of a fully functional system for tire fill assistance session control. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of tire fill assistance session control, the method comprising:

identifying, by a tire fill assistance controller, a user selection indicating a tire for electronic tire fill assistance;

establishing, by the tire fill assistance controller in dependence upon the user selection, a wireless connection to a tire pressure monitoring (TPM) sensor associated with the tire;

configuring, by the tire fill assistance controller, a tire pressure sampling rate of the TPM sensor for a tire fill assistance session;

receiving, by the tire fill assistance controller, a plurality of tire pressure readings from the TPM sensor during the tire fill assistance session; and providing, by the tire fill assistance controller to a user, tire fill guidance based on the plurality of tire pressure readings.

2. The method of claim 1, wherein the tire pressure sampling rate is configured by the tire fill assistance controller prior to tire inflation.

3. The method of claim 1, wherein a smart device includes the tire fill assistance controller.

4. The method of claim 1 further comprising:

identifying, by the tire fill assistance controller, that tire inflation is detected by the TPM sensor; and notifying the user that tire inflation is detected in the tire.

5. The method of claim 1 further comprising:

detecting, by the tire fill assistance controller, an inactivity state; and reconfiguring, by the tire fill assistance controller in response to the inactivity state, at least one of a connection parameter for the wireless connection and a tire pressure sampling rate of the TPM sensor.

6. The method of claim 5 further comprising:

terminating, by the tire fill assistance controller, the tire fill assistance session in response to determining that the inactivity state has exceeded a maximum inactivity duration.

7. The method of claim 1 further comprising:

terminating, by the tire fill assistance controller, the tire fill assistance session in response to determining that one or more tires of a vehicle are in motion.

8. The method of claim 1 further comprising:

initiating, by the tire fill assistance controller, a rapid reconnection procedure for reconnecting to the TPM sensor in response to detecting a termination of the wireless connection.

9. The method of claim 1 further comprising:

identifying, by the tire fill assistance controller while the tire fill assistance session is active for the tire, that tire inflation is detected in a different tire; and indicating, by the tire fill assistance controller to a user, that tire inflation is detected in the different tire.

10. The method of claim 1 further comprising:

providing, by the tire fill assistance controller to the TPM sensor, one or more ambient conditions parameters, wherein the one or more ambient conditions parameters include at least one of an atmospheric pressure parameter, an ambient temperature parameter, and an altitude parameter.

11. A method of tire fill assistance session control, the method comprising:

transmitting, by a tire pressure monitoring (TPM) sensor associated with a tire, one or more advertisement messages;

establishing, by the TPM sensor, a wireless connection with a tire fill assistance controller;

increasing, by the TPM sensor, a tire pressure sampling rate; and providing, by the TPM sensor to the tire fill assistance controller through the wireless connection, one or more tire pressure readings in accordance with the tire pressure sampling rate.

12. The method of claim 11, wherein the TPM sensor is mounted in the tire.

13. The method of claim 11, wherein a smart device includes the tire fill assistance controller.

14. The method of claim 11 further comprising:

reducing, by the TPM sensor in response to detecting an inactivity state, a tire pressure sampling rate of the TPM sensor.

15. The method of claim 14 further comprising:

terminating, by the TPM sensor, a tire fill assistance session in response to determining that the inactivity state has exceeded a maximum inactivity duration.

16. The method of claim 11 further comprising:

terminating, by the TPM sensor, the tire fill assistance session in response to determining that one or more tires of a vehicle are in motion.

17. The method of claim 11, wherein transmitting, by a TPM sensor associated with a tire, one or more advertisement messages includes:

initiating, by the TPM sensor, connectable advertisements in response to detecting motion of the tire; and discontinuing, by the TPM sensor, the connectable advertisements in response to detecting that motion of the tire has stopped and a service duration has expired.

18. The method of claim 11, wherein transmitting, by a TPM sensor associated with a tire, one or more advertisement messages includes:

initiating, by the TPM sensor, connectable advertisements in response to detecting inflation of the tire; and discontinuing, by the TPM sensor, the connectable advertisements in response to detecting that inflation of the tire has stopped.

19. The method of claim 11 further comprising:

initiating, by the TPM sensor, rapid connectable advertisements in response to determining that a tire fill assistance session has been terminated.

20. The method of claim 11 further comprising:

receiving, by the TPM sensor, one or more ambient conditions parameters, wherein the one or more ambient conditions parameters include at least one of an atmospheric pressure parameter, an ambient temperature parameter, and an altitude parameter.

* * * * *